United States Patent
Engelberg et al.

(10) Patent No.: US 11,876,824 B2
(45) Date of Patent: Jan. 16, 2024

(54) EXTRACTING PROCESS AWARE ANALYTICAL ATTACK GRAPHS THROUGH LOGICAL NETWORK ANALYSIS

(71) Applicant: Accenture Global Solutions Limited, Dublin (IE)

(72) Inventors: Gal Engelberg, Pardes-hana (IL); Dan Klein, Rosh Ha'ayin (IL); Tomer Ram, Netanya (IL); Benny Rochwerger, Tel Aviv (IL)

(73) Assignee: Accenture Global Solutions Limited, Dublin (IE)

( * ) Notice: Subject to any disclaimer, the term of this patent is extended or adjusted under 35 U.S.C. 154(b) by 405 days.

(21) Appl. No.: 17/358,381

(22) Filed: Jun. 25, 2021

(65) Prior Publication Data

US 2021/0409426 A1    Dec. 30, 2021

Related U.S. Application Data

(60) Provisional application No. 63/043,847, filed on Jun. 25, 2020.

(51) Int. Cl.
*H04L 9/40* (2022.01)
*H04L 41/22* (2022.01)

(52) U.S. Cl.
CPC .......... *H04L 63/1433* (2013.01); *H04L 41/22* (2013.01); *H04L 63/145* (2013.01);
(Continued)

(58) Field of Classification Search
USPC ........................................................ 726/22
See application file for complete search history.

(56) References Cited

U.S. PATENT DOCUMENTS

| 5,521,910 A | 5/1996 | Matthews |
| 6,279,113 B1 | 8/2001 | Vaidya |

(Continued)

FOREIGN PATENT DOCUMENTS

| EP | 1559008 | 8/2005 |
| EP | 1768043 | 3/2007 |

(Continued)

OTHER PUBLICATIONS

Chen Zhong, Towards Agile Cyber Analysis: Leveraging Visualization as Functions in Collaborative Visual Analytics, IEEE:2017, pp. 1-2.

(Continued)

*Primary Examiner* — Sakinah White Taylor
(74) *Attorney, Agent, or Firm* — Fish & Richardson P.C.

(57) ABSTRACT

Methods, systems, and computer-readable storage media for receiving a AAG from computer-readable memory, generating from logical network ontology data, asset inventory data, and asset communication data, a logical topology of the enterprise network as a computer-readable data structure, defining, at least partially by executing community detection over the logical topology, a sub-set of groups within the enterprise network, each group representing a process of a plurality of process, each process being at least partially executed by one or more assets within the enterprise network, processing the AAG based on the sub-set of groups and data from one or more contextual data sources to provide the process aware AAG, the process aware AAG defining a mapping between an infrastructure-layer of the enterprise network and a process-layer of the enterprise network, and executing one or more remedial actions in the enterprise network in response to analytics executed on the process aware AAG.

17 Claims, 10 Drawing Sheets

(52) U.S. Cl.
CPC ...... *H04L 63/1416* (2013.01); *H04L 63/1425* (2013.01); *H04L 63/20* (2013.01)

(56) References Cited

U.S. PATENT DOCUMENTS

| | | |
|---|---|---|
| 6,487,666 B1 | 11/2002 | Shanklin et al. |
| 7,540,025 B2 | 5/2009 | Tzadikario |
| 7,703,138 B2 | 4/2010 | Desai et al. |
| 7,904,962 B1 | 3/2011 | Jajodia et al. |
| 8,099,760 B2 | 1/2012 | Cohen et al. |
| 8,176,561 B1 | 5/2012 | Hurst et al. |
| 8,656,493 B2 | 2/2014 | Capalik |
| 8,881,288 B1 | 11/2014 | Levy et al. |
| 9,256,739 B1 | 2/2016 | Roundy et al. |
| 9,563,771 B2 | 2/2017 | Lang et al. |
| 9,633,306 B2 | 4/2017 | Liu et al. |
| 10,084,804 B2 | 9/2018 | Kapadia et al. |
| 10,291,645 B1 | 5/2019 | Frantzen et al. |
| 10,382,473 B1 | 8/2019 | Ashkenazy et al. |
| 10,447,721 B2 | 10/2019 | Lasser |
| 10,447,727 B1 | 10/2019 | Hecht |
| 10,601,854 B2 | 3/2020 | Lokamathe et al. |
| 10,642,840 B1 | 5/2020 | Attaluri et al. |
| 10,659,488 B1 | 5/2020 | Rajasooriya et al. |
| 10,771,492 B2 | 9/2020 | Hudis et al. |
| 10,848,515 B1 | 11/2020 | Pokhrel et al. |
| 10,868,825 B1 | 12/2020 | Dominessy et al. |
| 10,873,533 B1 | 12/2020 | Ismailsheriff et al. |
| 10,956,566 B2 | 3/2021 | Shu et al. |
| 10,958,667 B1 | 3/2021 | Maida et al. |
| 11,089,040 B2 | 8/2021 | Jang et al. |
| 11,128,654 B1 | 9/2021 | Joyce et al. |
| 11,159,555 B2 | 10/2021 | Hadar et al. |
| 11,184,385 B2 | 11/2021 | Hadar et al. |
| 11,232,235 B2 | 1/2022 | Hadar et al. |
| 11,277,431 B2 | 3/2022 | Hassanzadeh et al. |
| 11,281,806 B2 | 3/2022 | Hadar et al. |
| 11,283,824 B1 | 3/2022 | Berger et al. |
| 11,283,825 B2 | 3/2022 | Grabois et al. |
| 11,411,976 B2 | 8/2022 | Basovskiy et al. |
| 11,483,213 B2 | 10/2022 | Engelberg et al. |
| 11,533,332 B2 | 12/2022 | Engelberg et al. |
| 2005/0138413 A1 | 6/2005 | Lippmann et al. |
| 2005/0193430 A1 | 9/2005 | Cohen et al. |
| 2006/0037077 A1 | 2/2006 | Gadde et al. |
| 2008/0044018 A1 | 2/2008 | Scrimsher et al. |
| 2008/0289039 A1 | 11/2008 | Rits et al. |
| 2008/0301765 A1 | 12/2008 | Nicol et al. |
| 2009/0077666 A1 | 3/2009 | Chen et al. |
| 2009/0138590 A1 | 5/2009 | Lee et al. |
| 2009/0307772 A1 | 12/2009 | Markham et al. |
| 2009/0319248 A1 | 12/2009 | White et al. |
| 2010/0058456 A1 | 3/2010 | Jajodia et al. |
| 2010/0100546 A1* | 4/2010 | Kohler ............... G06F 16/40 707/739 |
| 2010/0138925 A1 | 7/2010 | Barai et al. |
| 2010/0174670 A1 | 7/2010 | Malik et al. |
| 2011/0035803 A1 | 2/2011 | Lucangeli Obes et al. |
| 2011/0061104 A1 | 3/2011 | Sarraute Yamada et al. |
| 2011/0093916 A1 | 4/2011 | Lang et al. |
| 2011/0093956 A1 | 4/2011 | Laarakkers et al. |
| 2013/0097125 A1 | 4/2013 | Marvasti et al. |
| 2013/0219503 A1 | 8/2013 | Amnon et al. |
| 2014/0082738 A1 | 3/2014 | Bahl |
| 2014/0173740 A1 | 6/2014 | Albanese et al. |
| 2015/0047026 A1 | 2/2015 | Neil et al. |
| 2015/0106867 A1 | 4/2015 | Liang |
| 2015/0199207 A1 | 7/2015 | Lin et al. |
| 2015/0261958 A1 | 9/2015 | Hale et al. |
| 2015/0326601 A1 | 11/2015 | Grondin et al. |
| 2015/0350018 A1 | 12/2015 | Hui et al. |
| 2016/0105454 A1 | 4/2016 | Li et al. |
| 2016/0205122 A1 | 7/2016 | Bassett |
| 2016/0277423 A1 | 9/2016 | Apostolescu et al. |
| 2016/0292599 A1 | 10/2016 | Andrews et al. |
| 2016/0301704 A1 | 10/2016 | Hassanzadeh et al. |
| 2016/0301709 A1 | 10/2016 | Hassanzadeh et al. |
| 2017/0012836 A1 | 1/2017 | Tongaonkar et al. |
| 2017/0032130 A1 | 2/2017 | Joseph et al. |
| 2017/0041334 A1 | 2/2017 | Kahn et al. |
| 2017/0060958 A1* | 3/2017 | Van Rest ............ G06F 16/9024 |
| 2017/0078322 A1 | 3/2017 | Seiver et al. |
| 2017/0085595 A1 | 3/2017 | Ng et al. |
| 2017/0163506 A1 | 6/2017 | Keller |
| 2017/0230410 A1 | 8/2017 | Hassanzadeh et al. |
| 2017/0318050 A1 | 11/2017 | Hassanzadeh et al. |
| 2017/0324768 A1 | 11/2017 | Crabtree et al. |
| 2017/0364702 A1 | 12/2017 | Goldfarb et al. |
| 2017/0366416 A1 | 12/2017 | Beecham et al. |
| 2018/0013771 A1 | 1/2018 | Crabtree et al. |
| 2018/0103052 A1 | 4/2018 | Choudhury et al. |
| 2018/0152468 A1 | 5/2018 | Nor et al. |
| 2018/0159890 A1 | 6/2018 | Warnick et al. |
| 2018/0183827 A1 | 6/2018 | Zorlular et al. |
| 2018/0255077 A1 | 9/2018 | Paine |
| 2018/0255080 A1 | 9/2018 | Paine |
| 2018/0295154 A1 | 10/2018 | Crabtree et al. |
| 2018/0367548 A1 | 12/2018 | Stokes, III et al. |
| 2019/0052663 A1 | 2/2019 | Lee et al. |
| 2019/0052664 A1 | 2/2019 | Kibler et al. |
| 2019/0132344 A1 | 5/2019 | Lem et al. |
| 2019/0141058 A1 | 5/2019 | Hassanzadeh et al. |
| 2019/0182119 A1 | 6/2019 | Ratkovic et al. |
| 2019/0188389 A1 | 6/2019 | Peled et al. |
| 2019/0230129 A1 | 7/2019 | Digiambattista et al. |
| 2019/0312898 A1 | 10/2019 | Verma et al. |
| 2019/0319987 A1 | 10/2019 | Levy et al. |
| 2019/0362279 A1 | 11/2019 | Douglas |
| 2019/0373005 A1 | 12/2019 | Bassett |
| 2020/0014265 A1 | 1/2020 | Whebe Spiridon |
| 2020/0014718 A1 | 1/2020 | Joseph Durairaj et al. |
| 2020/0042328 A1 | 2/2020 | Gupta |
| 2020/0042712 A1 | 2/2020 | Foo et al. |
| 2020/0045069 A1 | 2/2020 | Nanda et al. |
| 2020/0099704 A1 | 3/2020 | Lee et al. |
| 2020/0112487 A1 | 4/2020 | Inamdar et al. |
| 2020/0128047 A1 | 4/2020 | Biswas et al. |
| 2020/0137104 A1 | 4/2020 | Hassanzadeh et al. |
| 2020/0175175 A1 | 6/2020 | Hadar et al. |
| 2020/0177615 A1 | 6/2020 | Grabois et al. |
| 2020/0177616 A1 | 6/2020 | Hadar et al. |
| 2020/0177617 A1 | 6/2020 | Hadar et al. |
| 2020/0177618 A1 | 6/2020 | Hassanzadeh et al. |
| 2020/0177619 A1 | 6/2020 | Hadar et al. |
| 2020/0272972 A1 | 8/2020 | Harry et al. |
| 2020/0296137 A1 | 9/2020 | Crabtree et al. |
| 2020/0311630 A1 | 10/2020 | Risoldi et al. |
| 2020/0351295 A1 | 11/2020 | Nhlabatsi et al. |
| 2020/0358804 A1 | 11/2020 | Crabtree et al. |
| 2021/0006582 A1 | 1/2021 | Yamada et al. |
| 2021/0099490 A1 | 4/2021 | Crabtree et al. |
| 2021/0105294 A1 | 4/2021 | Kruse et al. |
| 2021/0168175 A1 | 6/2021 | Crabtree et al. |
| 2021/0173711 A1 | 6/2021 | Crabtree et al. |
| 2021/0218770 A1 | 7/2021 | Ben-Yosef et al. |
| 2021/0248443 A1 | 8/2021 | Shu et al. |
| 2021/0273978 A1 | 9/2021 | Hadar et al. |
| 2021/0288995 A1 | 9/2021 | Attar et al. |
| 2021/0336981 A1 | 10/2021 | Akella et al. |
| 2021/0409439 A1 | 12/2021 | Engelberg et al. |
| 2022/0014445 A1 | 1/2022 | Engelberg et al. |
| 2022/0014534 A1 | 1/2022 | Basovskiy et al. |
| 2022/0021698 A1 | 1/2022 | Hadar et al. |
| 2022/0038491 A1 | 2/2022 | Hadar et al. |
| 2022/0051111 A1 | 2/2022 | Hadar et al. |
| 2022/0070202 A1 | 3/2022 | Busany et al. |
| 2022/0124115 A1 | 4/2022 | Grabois et al. |
| 2022/0129590 A1 | 4/2022 | Hadar et al. |
| 2022/0131894 A1 | 4/2022 | Hassanzadeh et al. |
| 2022/0150270 A1 | 5/2022 | Klein et al. |
| 2022/0182406 A1 | 6/2022 | Inokuchi |
| 2022/0188460 A1 | 6/2022 | Hadar et al. |
| 2022/0263855 A1 | 8/2022 | Engelberg et al. |
| 2022/0337617 A1 | 10/2022 | Basovskiy et al. |

(56) References Cited

U.S. PATENT DOCUMENTS

| | | |
|---|---|---|
| 2023/0021961 A1 | 1/2023 | Engelberg et al. |
| 2023/0034910 A1 | 2/2023 | Engelberg et al. |
| 2023/0067128 A1 | 3/2023 | Engelberg et al. |
| 2023/0067777 A1 | 3/2023 | Hadar et al. |
| 2023/0076372 A1 | 3/2023 | Engelberg et al. |

FOREIGN PATENT DOCUMENTS

| | | |
|---|---|---|
| EP | 2385676 | 11/2011 |
| EP | 2816773 | 12/2014 |
| EP | 3644579 | 4/2020 |
| EP | 3664411 | 6/2020 |
| WO | WO 2018/002484 | 1/2018 |
| WO | WO 2020/242275 | 12/2020 |

OTHER PUBLICATIONS

EP Extended Search Report in European Appln. No. 22187514.9, dated Nov. 29, 2022, 7 pages.

Abraham et al. "A Predictive Framework for Cyber Security Analytics Using Attack Graphs." International Journal of Computer Networks & Communications (IJCNC). vol. 7, No. 1, Jan. 2015. (Year: 2015).

EP Extended Search Report in European Appln. No. 22193272.6, dated Jan. 25, 2023, 8 pages.

CyberSecurity Works.com [online], "MITRE Mapping of CISA KEVs and its Challenges," Jun. 29, 2022, retrieved on Oct. 4, 2022, retrieved from URL<https://cybersecurityworks.com/blog/cisa/mitre-mapping-of-cisa-kevs-and-its-challenges.html>, 6 pages.

Cycognito.com [online], "Identifying and Managing Vulnerabilities on All Your Attacker-Exposed Assets, All the Time: Benefits of the CyCognito Platform for Vulnerability Management," available on or before Oct. 22, 2020 via Internet Archive: Wayback Machine URL<https://web.archive.org/web/20201022120625/https://www.cycognito.com/vulnerability-management>, retrieved on Oct. 4, 2022, retrieved from URL<https://www.cycognito.com/vulnerability-management>, 15 pages.

Das et al., "V2W-BERT: A Framework for Effective Hierarchical Multiclass Classification of Software Vulnerabilities," CoRR, submitted on Feb. 23, 2021, arXiv:2102.11498v1, 11 pages.

GitHub.com [online], "ALFA-group/BRON," available on or before Nov. 23, 2021 via Internet Archive: Wayback Machine URL<https://web.archive.org/web/20211123023700/https://github.com/ALFA-group/BRON>, retrieved on Oct. 4, 2022, retrieved from URL<https://github.com/ALFA-group/BRON>, 5 pages.

Grigorescu et al., "CVE2ATT&CK: BERT-Based Mapping of CVEs to MITRE Att&CK Techniques," Algorithms, Aug. 31, 2022, 15(9):314, 22 pages.

Mitre.org [online], "CAPEC: Common Attack Pattern Enumerations and Classifications," available on or before Jul. 21, 2007 via Internet Archive: Wayback Machine URL<https://web.archive.org/web/20070721234158/https://capec.mitre.org/>, retrieved on Oct. 4, 2022, retrieved from URL<https://capec.mitre.org/>, 2 pages.

Mitre.org [online], "CWE: Common Weakness Enumeration," available on or before Oct. 9, 2006 via Internet Archive: Wayback Machine URL<https://web.archive.org/web/20061009060144/https://cwe.mitre.org/>, retrieved on Oct. 4, 2022, retrieved from URL<https://cwe.mitre.org/>, 1 page.

W3.org [online], "SWRL: A Semantic Web Rule Language Combining OWL and RuleML," May 21, 2004, retrieved on Oct. 4, 2022, retrieved from URL<https://www.w3.org/Submission/SWRL/>, 24 pages.

3DS.com [online], "New Customer Experience," available on or before Aug. 7, 2020 via Internet Archive: Wayback Machine URL<https://web.archive.org/web/20200807204455/https://ifwe.3ds.com/transportation-mobility/new-customer-experience>, retrieved on Jul. 9, 2021, retrieved from URL<https://ifwe.3ds.com/transportation-mobility/new-customer-experience>, 9 pages.

Abraham et al., "Cyber Security Analytics: A Stochastic Model for Security Quantification Using Absorbing Markov Chains," Journal of Communications, Dec. 2014, 9(12):899-907.

Amar et al., "Using finite-state models for log differencing," Proceedings of the 2018 26th ACM Joint Meeting on European Software Engineering Conference and Symposium on the Foundations of Software Engineering (ESEC/FSE 2018), Lake Buena Vista, Florida, Nov. 4-9, 2018, 49-59.

Atoum et al., "A holistic cyber security implementation framework," Information Management & Computer Security, Jul. 2014, 22(3):251-264.

Barik et al., "Attack Graph Generation and Analysis Techniques," Defence Science Journal, Nov. 2016, 66(6):559-567.

Barrère et al., "Naggen: a Network Attack Graph GENeration Tool—IEE CNS 17 Poster," 2017 IEEE Conference on Communications and Network Security, Oct. 2017, Las Vegas, NV, USA, 378-379.

Bonacich, "Power and Centrality: A Family of Measures," American Journal of Sociology, Mar. 1987, 92(5):1170-1182.

Borgatti et al., "A Graph-theoretic perspective on centrality," Social Networks, Oct. 2006, 28(4):466-484.

Challenge.org [online], "Incorporating digital twin into internet cyber security—creating a safer future," May 2018, retrieved on Jul. 9, 2021, retrieved from URL<https://www.challenge.org/insights/digital-twin-cyber-security/>, 10 pages.

Cohen-Addad et al., "Hierarchical Clustering: Objective Functions and Algorithms," Journal of the ACM, Jun. 2019, 66(4):26, 42 pages.

EP Search Report in European Application No. EP 19212981, dated Mar. 4, 2020, 6 pages.

EP Search Report in European Application No. EP13290145, dated Nov. 12, 2013, 2 pages.

EP Search Report in European Application No. EP19212974, dated Feb. 14, 2020, 8 pages.

EP Search Report in European Application No. EP19212976, dated Feb. 14, 2020, 8 pages.

EP Search Report in European Application. No. 21159421.3, dated Jun. 30, 2021, 11 pages.

EP Search Report in European Application. No. EP20185251, dated Oct. 21, 2020, 7 pages.

Fielder et al., "Decision support approaches for cyber security investment," Decision Support Systems, Jun. 2016, 86:13-23.

Foundations of Databases, 1st ed., Abiteboul et al. (eds.), 1995, Chapter 12, 38 pages.

Fundamentals of Business Process Management, 2nd ed., Dumas et al. (eds.), 2018, 546 pages.

GE.com [online], "Predix Platform," available on or before Nov. 16, 2018 via Internet Archive: Wayback Machine URL<https://web.archive.org/web/20181116005032/https://www.ge.com/digital/iiot-platform>; retrieved on Jul. 9, 2021, retrieved from URL<https://www.ge.com/digital/iiot-platform>, 6 pages.

Gergeleit et al., "Modeling Security Requirements and Controls for an Automated Deployment of Industrial IT Systems," Kommunikation und Bildverarbeitung in der Automation. Technologien für die intelligente Automation (Technologies for Intelligent Automation), Jan. 14, 2020, 12:217-231.

Grieves, "Virtually Intelligent Product Systems: Digital and Physical Twins", Complex Systems Engineering: Theory and Practice, Jul. 2019, 256:175-200.

Hadar et al., "Big Data Analytics on Cyber Attack Graphs for Prioritizing Agile Security Requirements", Proceedings of the 2019 IEEE 27th International Requirements Engineering Conference, Sep. 23-27, 2019, Jeju Island, Kora, 330-339.

Hadar et al., "Cyber Digital Twin Simulator for Automatic Gathering and Prioritization of Security Controls Requirements," Proceedings of the 2020 IEEE 28th International Requirements Engineering Conference, Aug. 31-Sep. 4, 2020, Zurich, Switzerland, 250-259.

Hansen et al., "Model-in-the-Loop and Software-in-the-Loop Testing of Closed-Loop Automotive Software with Arttest," Informatik, 2017, 13 pages.

(56) References Cited

OTHER PUBLICATIONS

Hasan et al., "Towards Optimal Cyber Defense Remediation in Energy Delivery Systems", Proceedings of 2019 IEEE Global Communications Conference, Dec. 9-13, 2019, Waikoloa, Hawaii, 7 pages.
Hofner et al., "Dijkstra, Floyd and Warshall meet Kleene," Formal Aspects of Computing, Jul. 2012, 24(4-6):459-476.
Husák et al., "Survey of Attack Projection, Prediction, and Forecasting in Cyber Security," IEEE Communications Surveys & Tutorials, Sep. 24, 2018, 21(1):640-660.
Idika et al., "Extending attack graph-based security metrics and aggregating their application," IEEE Transactions on Dependable and Secure Computing, Jan./Feb. 2012, 9(1):75-85.
IEEE.org [online], "This Car Runs on Code," Feb. 1, 2009, retrieved on Jul. 9, 2021, retrieved from URL<https://spectrum.ieee.org/transportation/systems/this-car-runs-on-code>, 5 pages.
Ingols et al., "Practical Attack Graph Generation for Network Defense," 2006 22nd Annual Computer Security Applications Conference (ACSAC'06), Miami Beach, Florida, Dec. 11-15, 2006, 10 pages.
International Organization for Standardization, "International Standard: ISO/IEC 27001," ISO/IEC 27001:2013(E), Oct. 1, 2013, 29 pages.
Joint Task Force Transformation Initiative, "Security and Privacy Controls for Federal Information Systems and Organizations," National Institute of Standards and Technology Special Publication 800-53, Revision 4, Jan. 22, 2015, 462 pages.
Khouzani et al., "Scalable min-max multi-objective cyber-security optimization over probabilistic attack graphs", European Journal of Operational Research, Nov. 1, 2019, 278(3):894-903.
Li et al., "Cluster security research involving the modeling of network exploitations using exploitation graphs," Proceedings of the IEEE International Symposium on Cluster Computing and the Grid, Singapore, May 16-19, 2006, 11 pages.
Lippmann et al., "Validating and restoring defense in depth using attack graphs," Proceedings of the Military Communications Conference, Washington, DC, USA, Oct. 23-25, 2006, 10 pages.
Lu et al., "Ranking attack graphs with graph neural networks," Proceedings of the 5th International Conference on Information Security Practice and Experience, Xi'an, China, Apr. 13-15, 2009; Lecture Notes in Computer Science, Apr. 2009, 5451:345-359.
Manning Free Content Center [online], "Building Your Vocabulary," dated May 19, 2017, retrieved on Jun. 3, 2020, retrieved from URL <https://freecontent.manning.com/building-your-vocabulary/>, 10 pages.
MaschinenMarkt.international [online], "Digital twin in the automobile industry," Aug. 1, 2019, retrieved on Jul. 9, 2021, retrieved from URL<https://www.maschinenmarkt.international/digital-twin-in-the-automobile-industry-a-851549/>, 3 pages.
Mashable.com [online], "Ford ready to innovate, but not at the expense of customer needs," May 31, 2016, retrieved on Jul. 9, 2021, retrieved from URL<https://mashable.com/article/mark-fields-ford-codecon>, 7 pages.
Mehta et al., "Ranking attack graphs," Proceedings of the International Conference on Recent Advances in Intrusion Detection, Hamburg, Germany, Sep. 20-22, 2006; Lecture Notes in Computer Science, Sep. 2006, 4219:127-144.
National Institute of Standards and Technology [online], "National Vulnerability Database," last updated Jun. 2, 2020, retrieved on Jun. 3, 2020, retrieved from URL<https://nvd.nist.gov/>, 4 pages.
Networks: An Introduction, Newman (ed.), May 2010, 789 pages.
Noel et al., "CyGraph: Graph-Based Analytics and Visualization for Cybersecurity," Handbook of Statistics, Jan. 2016, 35:117-167.
Ortalo et al., "Experimenting with quantitative evaluation tools for monitoring operational security," IEEE Transactions on Software Engineering, Sep./Oct. 1999, 25(5):633-650.
Ou et al., "A Scalable Approach to Attack Graph Generation," Proceedings of the 13th ACM Conference on Computer and Communication Security, Oct. 2006, 336-345.
Ou et al., "MulVAL: A Logic-based Network Security Analyzer," 14th USENIX Security Symposium, Aug. 2005, Baltimore, MD, USA, 16 pages.
Phillips et al., "A graph-based system for network-vulnerability analysis," Proceedings of the 1998 Workshop on New Security Paradigms, Charlottesville, Virginia, Sep. 22-26, 1998, 71-79.
Process Mining, 1st ed., van der Aalst, 2011, Chapters 5-6, 63 pages.
Purvine et al., "A Graph-Based Impact Metric for Mitigating Latheral Movement Cyber Attacks", Automated Descision Making for Active Cyber Defence, Oct. 2016, pp. 45-52.
Schatz et al., "Economic valuation for information security investment: a systematic literature review," Information Systems Frontiers, Apr. 18, 2016, 19:1205-1228.
Shandilya et al., "Use of Attack Graphs in Security Systems", Hindawi Journal of Computer Networks and Communications, Oct. 20, 2014, 2014:818957, 14 pages.
Shi et al., "Normalized Cuts and Image Segmentation," IEEE Transactions on Pattern Analysis and Machine Intelligence, Aug. 2000, 22(8):888-905.
Siemens.com [online], "From vehicle design to multi-physical simulations," available on or before Jul. 26, 2019 via Internet Archive: Wayback Machine URL<https://web.archive.org/web/20190726044643/https://new.siemens.com/global/en/markets/automotive-manufacturing/digital-twin-product.html>, retrieved on Jul. 9, 2021, retrieved from URL<https://new.siemens.com/global/en/markets/automotive-manufacturing/digital-twin-product.html>, 11 pages.
SMMT.co.uk [online], "Role of Digital Twin in Automotive Industry," Dec. 17, 2018, retrieved on Jul. 9, 2021, retrieved from URL<https://www.smmt.co.uk/2018/12/role-of-digital-twin-in-automotive-industry/>, 9 pages.
Sourceforge.net [online], "XSB," last updated Oct. 29, 2017, retrieved on Jun. 3, 2020, retrieved from URL <http://xsb.sourceforge.net/>, 2 pages.
Stanek et al., "Method of comparing graph differencing algorithms for software differencing," 2008 IEEE International Conference on Electro/Information Technology, Ames, Iowa, May 18-20, 2008, 482-487.
Strom et al., "MITRE ATT&CK™: Design and Philosophy", The MITRE Corporation, Jul. 2018, 37 pages.
Swiler et al., "A graph-based network-vulnerability analysis system," Sandia National Laboratories, 1997, Tech. Rep. SAND97-3010/1, 25 pages.
TechCrunch.com [online], "Tesla is rolling out its Navigate on Autopilot feature," Oct. 27, 2018, retrieved on Jul. 9, 2021, retrieved from URL<https://techcrunch.com/2018/10/26/tesla-is-rolling-out-its-navigate-on-autopilot-feature/>, 17 pages.
The Fourth Industrial Revolution, 1st. ed., Schwab, Jan. 2017, 218 pages.
The MITRE Corporation [online], "MITRE ATT&CK," last updated May 27, 2020, retrieved on Jun. 3, 2020, retrieved from URL <https://attack.mitre.org/>, 3 pages.
Ullah et al., "Towards Modeling Attacker's Opportunity for Improving Cyber Resilience in Energy Delivery Systems", Resilience Week, Aug. 2018, pp. 100-107.
Vehicle Power Management, 1st ed., Zhang et al (eds.), Aug. 2011, Chapter 10, 27 pages.
Wang et al., "A Network Vulnerability Assessment Method Based on Attack Graph," 2018 IEEE 4th International Conference on Computer and Communications, Dec. 7-10, 2018, Chengdu, China, 1149-1154.
Wang et al., "Exploring Attack Graph for Cost-benefit Security Hardening: A Probabilistic Approach," Computers & Security, Feb. 2013, 32:158-169.
Ward et al., "Threat Analysis and Risk Assessment in Automotive Cyber Security," SAE Int. J. Passeng. Cars Electron. Electr. Systems, May 2013, 6(2):507-513.
Wikipedia.org [online], "5G," last updated Jul. 9, 2021, retrieved on Jul. 9, 2021, retrieved from URL<https://en.wikipedia.org/wiki/5G>, 29 pages.
Wikipedia.org [online], "Active Directory," last updated Jun. 1, 2020, retrieved on Jun. 3, 2020, retrieved from URL <https://en.wikipedia.org/wiki/Active_Directory>, 14 pages.

(56) References Cited

OTHER PUBLICATIONS

Wikipedia.org [online], "Backward Chaining," last updated Nov. 16, 2019, retrieved on Jun. 3, 2020, retrieved from URL <https://en.wikipedia.org/wiki/Backward_chaining>, 3 pages.
Wikipedia.org [online], "Cartesian Product," last updated Feb. 28, 2020, retrieved on Jun. 3, 2020, retrieved from URL <https://en.wikipedia.org/wiki/Cartesian_product>, 9 pages.
Wikipedia.org [online], "Centrality," last updated May 29, 2020, retrieved on Jun. 3, 2020, retrieved from URL <https://en.wikipedia.org/wiki/Centrality>, 15 pages.
Wikipedia.org [online], "Centrality," last updated Oct. 18, 2020, retrieved on Oct. 26, 2020, retrieved from URL<https://en.wikipedia.org/wiki/Centrality>, 15 pages.
Wikipedia.org [online], "Common Vulnerabilities and Exposures," last updated Jul. 6, 2021, retrieved on Jul. 9, 2021, retrieved from URL<https://en.wikipedia.org/wiki/Common_Vulnerabilities_and_Exposures>, 5 pages.
Wikipedia.org [online], "Common Vulnerability Scoring System," last updated Jun. 21, 2021, retrieved on Jul. 9, 2021, retrieved from URL<https://en.wikipedia.org/wiki/Common_Vulnerability_Scoring_System>, 7 pages.
Wikipedia.org [online], "Digital twin," last updated Jul. 8, 2021, retrieved on Jul. 9, 2021, retrieved from URL<https://en.wikipedia.org/wiki/Digital_twin>, 13 pages.
Wikipedia.org [online], "Eigenvector centrality," last updated Dec. 1, 2020 retrieved on Jan. 11, 2021, retrieved from URL<https://en.wikipedia.org/wiki/Eigenvector_centrality>, 4 pages.
Wikipedia.org [online], "Flood Fill," last updated Dec. 24, 2019, retrieved on Jun. 3, 2020, retrieved from URL <https://en.wikipedia.org/wiki/Flood_fill>, 7 pages.
Wikipedia.org [online], "Floyd-Warshall algorithm," last updated Jan. 5, 2021, retrieved on Jan. 11, 2021, retrieved from URL<https://en.wikipedia.org/wiki/Floyd%E2%80%93Warshall_algorithm>, 7 pages.
Wikipedia.org [online], "Forward Chaining," last updated Nov. 18, 2019, retrieved on Jun. 3, 2020, retrieved from URL <https://en.wikipedia.org/wiki/Forward_chaining>, 3 pages.
Wikipedia.org [online], "Look-ahead (backtracking)," last updated May 23, 2020, retrieved on Jun. 3, 2020, retrieved from URL <https://en.wikipedia.org/wiki/Look-ahead_(backtracking)>, 3 pages.
Wikipedia.org [online], "SCADA," last updated Jun. 2, 2020, retrieved on Jun. 3, 2020, retrieved from URL <https://en.wikipedia.org/wiki/SCADA>, 12 pages.
Wikipedia.org [online], "Sigmoid function," last updated Dec. 25, 2020, retrieved on Jan. 11, 2021, retrieved from URL<https://en.wikipedia.org/wiki/Sigmoid_function>, 4 pages.
Wikipedia.org [online], "SWOT analysis," last updated Oct. 20, 2020, retrieved on Oct. 26, 2020, retrieved from URL<https://en.wikipedia.org/wiki/SWOT_analysis>, 8 pages.
Wikipedia.org [online], "Traffic congestion," last updated Oct. 5, 2020, retrieved on Oct. 26, 2020, retrieved from URL<https://en.wikipedia.org/wiki/Traffic_congestion>, 24 pages.
Wikipedia.org [online], "Traffic flow," last updated Oct. 19, 2020, retrieved on Oct. 26, 2020, retrieved from URL<https://en.wikipedia.org/wiki/Traffic_flow>, 41 pages.
Wikipedia.org [online], "Zero-day (computing)," last updated Oct. 16, 2020, retrieved on Oct. 26, 2020, retrieved from URL<https://en.wikipedia.org/wiki/Zero-day_(computing)>, 8 pages.
Xie et al., "Using Bayesian Networks for Cyber Security Analysis," Proceedings of the 2010 IEEE/IFIP International Conference on Dependable Systems & Networks, Jun. 28-Jul. 1, 2010, Chicago, Illinois, 211-220.
Yi et al., "Overview on attack graph generation and visualization technology," 2013 International Conference on Anti-Counterfeiting, Security and Identification (ASID), Shanghai, China, Oct. 25-27, 2013, 6 pages.
You et al., "A Review of Cyber Security Controls from an ICS Perspective," Proceedings of 2018 International Conference on Platform Technology and Service (PlatCon), Jan. 29-31, 2018, Jeju, South Korea, 5 pages.
Zeng et al., "Survey of Attack Graph Analysis Methods from the Perspective of Data and Knowledge Processing," Hindawi Security and Communication Networks, Dec. 26, 2019, 2019:2031063, 17 pages.
Zhang et al., "Co-simulation framework for design of time-triggered cyber physical systems," 2013 ACM/IEEE International Conference on Cyber-Physical Systems (ICCPS), Philadelphia, Pennsylvania, Apr. 8-11, 2013, 119-128.
Zhang et al., "Optimal Decision-Making Approach for Cyber Security Defense Using Game Theory and Intelligent Learning," Security and Communication Networks, Dec. 23, 2019, 2019:3038586, 17 pages.
Zhao et al., "Attack graph analysis method for large scale network security hardening," J. Front. Comput. Sci. Technology, 2018, 12(2):263-273 (with English Abstract).
Narmeen Zakaria Bawany; DDoS Attack Detection and Mitigation Using SON: Methods, Practices, and Solutions; Springer—2017; p. 425-441.
Q. Lin et al., "Latte: Large-Scale Lateral Movement Detection," MILCOM 2018—2018 IEEE Military Communications Conference (MILCOM), 2018, pp. 1-6, doi: 10.1109/MILCOM.2018.8599748. (Year: 2018).
X. Li, C. Zhang, T. Jung, J. Qian and L. Chen, "Graph-based privacy-preserving data publication," IEEE INFOCOM 2016—The 35th Annual IEEE International Conference on Computer Communications, 2016, pp. 1-9, doi: 10.1109/IN F000M.2016.7524584. (Year: 2016).
Almeida et al., "An ontological analysis of the notion of community in the RM-ODP enterprise language," Computer Standards & Interfaces, Mar. 2013, 35(3):257-268.
Annane et al., "BBO: BPMN 2.0 based ontology for business process representation," Presented at Proceedings of the 20th European Conference on Knowledge Management (ECKM 2019), Lisbonne, Portugal, Sep. 5-6, 2019, 49-59.
Ashton et al., "That 'internet of things' thing," RFID Journal, Jun. 22, 2009, 1 page.
Borgo et al., "Ontological Foundations of DOLCE," Theory and Applications of Ontology: Computer Applications, Aug. 5, 2010, 279-295.
Burger et al., "Scaling to the end of silicon with edge architectures," Computer, Jul. 2004, 37(7):44-55.
Cravero, "Big data architectures and the internet of things: A systematic mapping study," IEEE Latin America Transactions, Apr. 2018, 16(4):1219-1226.
Daniele et al., "An ontological approach to logistics," Enterprise Interoperability: Research and Applications in the Service-oriented Ecosystem, Oct. 11, 2013, 199-213.
Degen et al., "Gol: toward an axiomatized upper-level ontology," Presented at Proceedings of the International Conference on Formal Ontology in Information Systems, Ogunquit, Maine, USA, Oct. 17-19, 2001, 34-46.
Duarte et al., "Towards an Ontology of Requirements at Runtime," Formal Ontology in Information Systems, Jan. 2016, 283:255-268.
El Saddik, "Digital Twins: The Convergence of Multimedia Technologies," IEEE MultiMedia, Apr.-Jun. 2018, 25(2):87-92.
Gailly et al., "Ontological Reengineering of the REA-EO using UFO," Presented at Proceedings of the International Workshop on Ontology-Driven Software Engineering, Orlando, FL, USA, Oct. 2009, 15 pages.
Gandomi et al., "Beyond the hype: Big data concepts, methods, and analytics," International Journal of Information Management, Apr. 2015, 35(2):137-144.
Genovese, "Data mesh: the newest paradigm shift for a distributed architecture in the data world and its application," Thesis for the degree of Computer Engineering, Politecnico di Torino, 2021, 76 pages.
Giunchiglia et al., "Lightweight Ontologies," Technical Report DIT-07-071, University of Trento, Oct. 2007, 10 pages.
Gomez-Perez et al., "Ontology languages for the Semantic Web," IEEE Intelligent Systems, Feb. 2002, 17(1):54-60.
Guarino, "Formal Ontology in Information Systems," Presented at Proceedings of the 1st International Conference, Trento, Italy, Jun. 6-8, 1998, 3-15.

(56) References Cited

OTHER PUBLICATIONS

Guizzardi et al., "An Ontology-Based Approach for Evaluating the Domain Appropriateness and Comprehensibility Appropriateness of Modeling Languages," MoDELS, 2005, 691-705.
Guizzardi, "On Ontology, ontologies, Conceptualizations, Modeling Languages, and (Meta)Models," Presented at Proceedings of the 2007 conference on Databases and Information Systems IV: Selected Papers from the Seventh International Baltic Conference, Amsterdam, Netherlands, Jun. 5, 2007, 18 pages.
Guizzardi, "Ontological Foundations for Structural Conceptual Models," Thesis for the degree of Doctor, University of Twente, 2005, 441 pages.
Guizzardi, "Ontology, Ontologies and the "I" of FAIR," Data Intelligence, Jan. 1, 2020, 2(1-2):181-191.
Guizzardi, "The role of foundational ontology for conceptual modeling and domain ontology representation," Presented at Proceedings of the 7th International Baltic Conference on Databases and Information Systems, Vilnius, Lithuania, Jul. 3-6, 2006, 9 pages.
Hassani et al., "Artificial Intelligence (AI) or Intelligence Augmentation (IA): What is the Future?," AI, Apr. 12, 2020, 1(2):143-155.
Herre, "General Formal Ontology (GFO): A Foundational Ontology for Conceptual Modelling," Theory and Applications of Ontology: Computer Applications, Aug. 12, 2010, 297-345.
Jacobsen et al., "FAIR Principles: Interpretations and Implementation Considerations," Data Intelligence, Jan. 1, 2020, 2(1-2):10-29.
Machado et al., "Data Mesh: Concepts and Principles of a Paradigm Shift in Data Architectures," Procedia Computer Science, 2022, 196:263-271.
Machado et al., "Data-Driven Information Systems: The Data Mesh Paradigm Shift," Presented at Proceedings of the 29th International Conference on Information Systems Development, Valencia, Spain, Sep. 8-10, 2021, 6 pages.
Makridakis, "The forthcoming artificial intelligence (ai) revolution: Its impact on society and firms," Futures, Jun. 2017, 90:46-60.
Martins et al., "A framework for conceptual characterization of ontologies and its application in the cybersecurity domain," Software and Systems Modeling, Jul. 2, 2022, 21:1437-1464.
Martins et al., "Conceptual Characterization of Cybersecurity Ontologies," The Practice of Enterprise Modelling, Nov. 18, 2020, 323-338.
Mathis, "Data lakes," Datenbank-Spektrum, Oct. 6, 2017, 17(3):289-293.
Monino, "Data Value, Big Data Analytics, and Decision-Making," Journal of the Knowledge Economy, Aug. 20, 2016, 256-267.
Sales et al., "'Ontological anti-patterns in taxonomic structures," Presented at Proceedings of ONTOBRAS 2019: XII Seminar on Ontology Research in Brazil, Porto Alegre, Brazil, Sep. 2-5, 2019, 13 pages.
Sitton-Candanedo et al., "A review of edge computing reference architectures and a new global edge proposal," Future Generation Computer Systems, Oct. 2019, 99:278-294.
Tan et al., "Future internet: The Internet of Things," Presented at Proceedings of the 2010 3rd International Conference on Advanced Computer Theory and Engineering (ICACTE), Chengdu, China, Aug. 20-22, 2010.
Uschold et al., "Ontologies: Principles, methods and applications," The Knowledge Engineering Review, Jan. 1996, 11(2):93-136.
Van Heijst et al., "Using explicit ontologies in KBS development," International Journal of Human-Computer Studies, Feb. 1997, 46(2-3):183-292.
Wand et al., "On the deep structure of information systems," Information Systems Journal, Jul. 1995, 5(3):203-223.
Wang et al., "Big data analytics in cyber security: network traffic and attacks," Journal of Computer Information Systems, Jan. 2020, 61(3):1-8.
Wu et al., "A service-oriented architecture for business intelligence," Presented at Proceedings of the IEEE International Conference on Service-Oriented Computing and Applications (SOCA '07), Newport Beach, CA, USA, Jun. 19-20, 2007, 279-285.
Brazhuk, "Towards automation of threat modeling based on a semantic model of attack patterns and weaknesses," arXiv, Dec. 8, 2021, arXiv:2112.04231v1, 14 pages.
EP Extended Search Report in European Appln. No. 22157487.4, dated Jun. 9, 2022, 10 pages.
Hemberg et al., "BRON—Linking Attack Tactics, Techniques, and Patterns with Defensive Weaknesses, Vulnerabilities and Affected Platform Configurations," arXiv, Oct. 1, 2020, arXiv:2010.00533v1, 14 pages.
Hemberg et al., "Using a Collated Cybersecurity Dataset for Machine Learning and Artificial Intelligence," arXiv, Aug. 5, 2021, arXiv:2108.02618v1, 5 pages.
Horrocks et al., "SWRL: A Semantic Web Rule Language Combining OWL and RuleML," W3C Member Submission, May 21, 2004, 24 pages.
Neo4j.com [online], "Topological link prediction," available on or before May 17, 2020, via Internet Archive: Wayback Machine URL<https://web.archive.org/web/20200517111258/https://neo4j.com/docs/graph-data-science/current/algorithms/linkprediction/>, retrieved on Jun. 14, 2022, retrieved from URL<https://neo4j.com/docs/graph-data-science/current/algorithms/linkprediction/>, 2 pages.
Rossi et al., "Knowledge Graph Embedding for Link Prediction: A Comparative Analysis," arXiv, Feb. 3, 2020, arXiv:2002.00819v1, 42 pages.
Wikipedia.org [online], "Natural language processing," last updated Jun. 10, 2022, retrieved on Jun. 14, 2022, retrieved from URL<https://en.wikipedia.org/wiki/Natural_language_processing>, 13 pages.
Kaloroumakis et al., "Toward a Knowledge Graph of Cybersecurity Countermeasures," Technical Report, The MITRE Corporation, 2021, 11 pages.
MITRE.org [online], "D3FEND," available on or before Jun. 22, 2021 via Internet Archive: Wayback Machine URL<https://web.archive.org/web/20210622142005/https://d3fend.mitre.org/>, retrieved on Jul. 13, 2022, retrieved from URL<https://d3fend.mitre.org/>, 3 pages.
MITRE.org [online], "Digital Artifact Ontology," available on or before Jun. 25, 2021 via Internet Archive: Wayback Machine URL<https://web.archive.org/web/20210625024718/https://d3fend.mitre.org/dao>, retrieved on Jul. 13, 2022, retrieved from URL<https://d3fend.mitre.org/dao/>, 3 pages.
MITRE.org [online], "Service Application," available on or before Jun. 25, 2021 via Internet Archive: Wayback Machine URL<https://web.archive.org/web/20210625024952/https://d3fend.mitre.org/dao/artifact/d3f:ServiceApplication/>, retrieved on Jul. 13, 2022, retrieved from URL<https://d3fend.mitre.org/dao/artifact/d3f:ServiceApplication/>, 1 page.
Wikipedia.org [online], "Reachability," last updated Oct. 22, 2021, retrieved on Jul. 13, 2022, retrieved from URL<https://en.wikipedia.org/wiki/Reachability>, 5 pages.
EP Extended Search Report in European Appln. No. 21191752.1, dated Jan. 4, 2022, 8 pages.
Alvarenga et al., "Discovering Attack Strategies Using Process Mining," Presented at Proceedings of The Eleventh Advanced International Conference on Telecommunications, Brussels, Belgium, Jun. 21-26, 2015, 119-125.
Chen et al., "Distributed Attack Modeling Approach Based on Process Mining and Graph Segmentation," Entropy, Sep. 2020, 22(9):1026, 21 pages.
Coltellese et al., "Triage of IoT Attacks Through Process Mining," Presented at Proceedings of On the Move to Meaningful Internet Systems Conference 2019, Rhodes, Greece, Oct. 21-25, 2019; Lecture Notes in Computer Science, Oct. 2019, 11877:326-344.
IEEE, "IEEE Standard for eXtensible Event Stream (XES) for Achieving Interoperability in Event Logs and Event Stream," IEEE Std 1849™—2016, Sep. 22, 2016, 50 pages.
Murata, "Petri Nets: Properties, Analysis and Applications," Proceedings of the IEEE, Apr. 1989, 77(4):541-580.
Neo4j.com [online], "Random Walk," available on or before Aug. 6, 2020 via Internet Archive: Wayback Machine URL<https://web.archive.org/web/20200806193136/https://neo4j.com/docs/graph-data-science/current/alpha-algorithms/random-walk/>, retrieved on Jul. 28, 2021, retrieved from URL<https://neo4j.com/docs/graph-data-science/current/alpha-algorithms/random-walk/>, 7 pages.

(56) References Cited

OTHER PUBLICATIONS

Neo4j.com [online], "Yen's K-Shortest Paths," available on or before Aug. 6, 2020 via Internet Archive: Wayback Machine URL<https://web.archive.org/web/20200806185626/https://neo4j.com/docs/graph-data-science/current/alpha-algorithms/yen-s-k-shortest-path/>, retrieved on Jul. 28, 2021, retrieved from URL<https://web.archive.org/web/20200806185626/https://neo4j.com/docs/graph-data-science/current/alpha-algorithms/yen-s-k-shortest-path/>, 5 pages.

PM4Py.de [online], "DFG: Process Discovery using Directly-Follows Graphs," available on or before Mar. 7, 2019 via Internet Archive: Wayback Machine URL<https://web.archive.org/web/20190307062454/http://pm4py.pads.rwth-aachen.de/documentation/process-discovery/dfg/>, retrieved on Jul. 28, 2021, retrieved from URL<https://web.archive.org/web/20190307062454/http://pm4py.pads.rwth-aachen.de/documentation/process-discovery/dfg/>, 4 pages.

PM4Py.de [online], "Process Discovery," available on or before Jun. 26, 2020 via Internet Archive: Wayback Machine URL<https://web.archive.org/web/20200626094921/https://pm4py.fit.fraunhofer.de/documentation#discovery>, retrieved on Jul. 28, 2021, retrieved from URL<https://pm4py.fit.fraunhofer.de/documentation#discovery>, 5 pages.

Van Der Aalst et al., "Causal Nets: A Modeling Language Tailored towards Process Discovery," Presented at Proceedings of CONCUR 2011—Concurrency Theory, Aachen, Germany, Sep. 6-9, 2011; Lecture Notes in Computer Science, Sep. 2011, 6901:28-42.

Wikipedia.org [online], "Breadth-first search," last updated Jul. 21, 2021, retrieved on Jul. 28, 2021, retrieved from URL<https://en.wikipedia.org/wiki/Breadth-first_search>, 6 pages.

Wikipedia.org [online], "Depth-first search," last updated Jun. 16, 2021, retrieved on Jul. 28, 2021, retrieved from URL<https://en.wikipedia.org/wiki/Depth-first_search>, 8 pages.

* cited by examiner

EXTRACTING PROCESS AWARE ANALYTICAL ATTACK GRAPHS THROUGH LOGICAL NETWORK ANALYSIS

CROSS-REFERENCE TO RELATED APPLICATIONS

This application claims priority to and the benefit of U.S. Prov. App. 63/043,847, filed on Jun. 25, 2020, which is expressly incorporated herein by reference in the entirety for all purposes.

BACKGROUND

Computer networks are susceptible to attack by malicious users (e.g., hackers). For example, hackers can infiltrate computer networks in an effort to obtain sensitive information (e.g., user credentials, payment information, address information, social security numbers) and/or to take over control of one or more systems. To defend against such attacks, enterprises use security systems to monitor occurrences of potentially adverse events within a network, and alert security personnel to such occurrences. For example, one or more dashboards can be provided, which provide lists of alerts that are to be addressed by the security personnel.

Modern computer networks are largely segregated and often deployed with diverse cyber defense mechanisms, which makes it challenging for an attacker (hacker) to gain direct access to a target (e.g., administrator credentials). This pattern is commonly seen in industrial control systems (ICSs) where a layered architecture ensures that targets are not in close proximity to the perimeter. Despite the presence of a layered architecture, the spate of attacks is increasing rapidly and span from large enterprises to critical infrastructure (CINF) networks. Due to the potential severe damage and cost experienced by a victim, CINFs have been intentionally targeted and have suffered from significant losses when successfully exploited.

In an effort to defend against cyber-attacks, so-called analytical attack graphs (AAGs) can be generated, which represent potential lateral movements of adversaries within computer networks. An AAG can be used to understand how a computer network can be hacked and undesirable consequences that can result. Accordingly, AAGs can be described as an important tool in developing anti-hacker defenses. For example, an AAG can be used to identify the most vulnerable components within a computer network, and can be used to evaluate fixes of vulnerabilities that the AAG reveals (e.g., by fixing a limited number of issues, any adversary attack on the computer network, or on certain components in the computer network can be stopped).

SUMMARY

Implementations of the present disclosure are directed to generating process aware analytical attack graphs (AAGs) for enterprise-wide cyber-security in enterprise networks. More particularly, implementations of the present disclosure are directed to generating process aware AAGs through logical network analysis. Implementations of the present disclosure are also directed to using process aware AAGs for abstracting enterprise processes within enterprise networks.

In some implementations, actions include receiving a AAG from computer-readable memory, generating from logical network ontology data, asset inventory data, and asset communication data, a logical topology of the enterprise network as a computer-readable data structure, defining, at least partially by executing community detection over the logical topology, a sub-set of groups within the enterprise network, each group representing a process of a plurality of process, each process being at least partially executed by one or more assets within the enterprise network, processing the AAG based on the sub-set of groups and data from one or more contextual data sources to provide the process aware AAG, the process aware AAG defining a mapping between an infrastructure-layer of the enterprise network and a process-layer of the enterprise network, storing the process aware AAG as a computer-readable data structure to computer-readable memory, and executing one or more remedial actions in the enterprise network in response to analytics executed on the process aware AAG. Other implementations of this aspect include corresponding systems, apparatus, and computer programs, configured to perform the actions of the methods, encoded on computer storage devices.

These and other implementations can each optionally include one or more of the following features: community detection includes executing hierarchical clustering over the logical topology to iteratively cluster nodes into groups in a set of groups; defining a sub-set of groups further includes determining a quality of respective groups in a set of groups based on a set of measures, each group having a sufficient quality being included in the sub-set of groups; the logical topology is representative of the enterprise network based on facts provided from each of the asset inventory data and the asset communication data; the logical ontology includes nodes representative of assets within the enterprise network and edges representative of communication between assets, each node and each edge being associated with a set of properties defining metadata describing a respective asset or a respective edge; the process aware AAG includes a set of group nodes and a set of asset nodes, each asset node being associated with at least one group node by an edge, each of the group nodes and each of the asset nodes being associated with a set of properties defining metadata describing context of a respective group node and asset node; and the context includes one or more of technical impact and financial impact.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
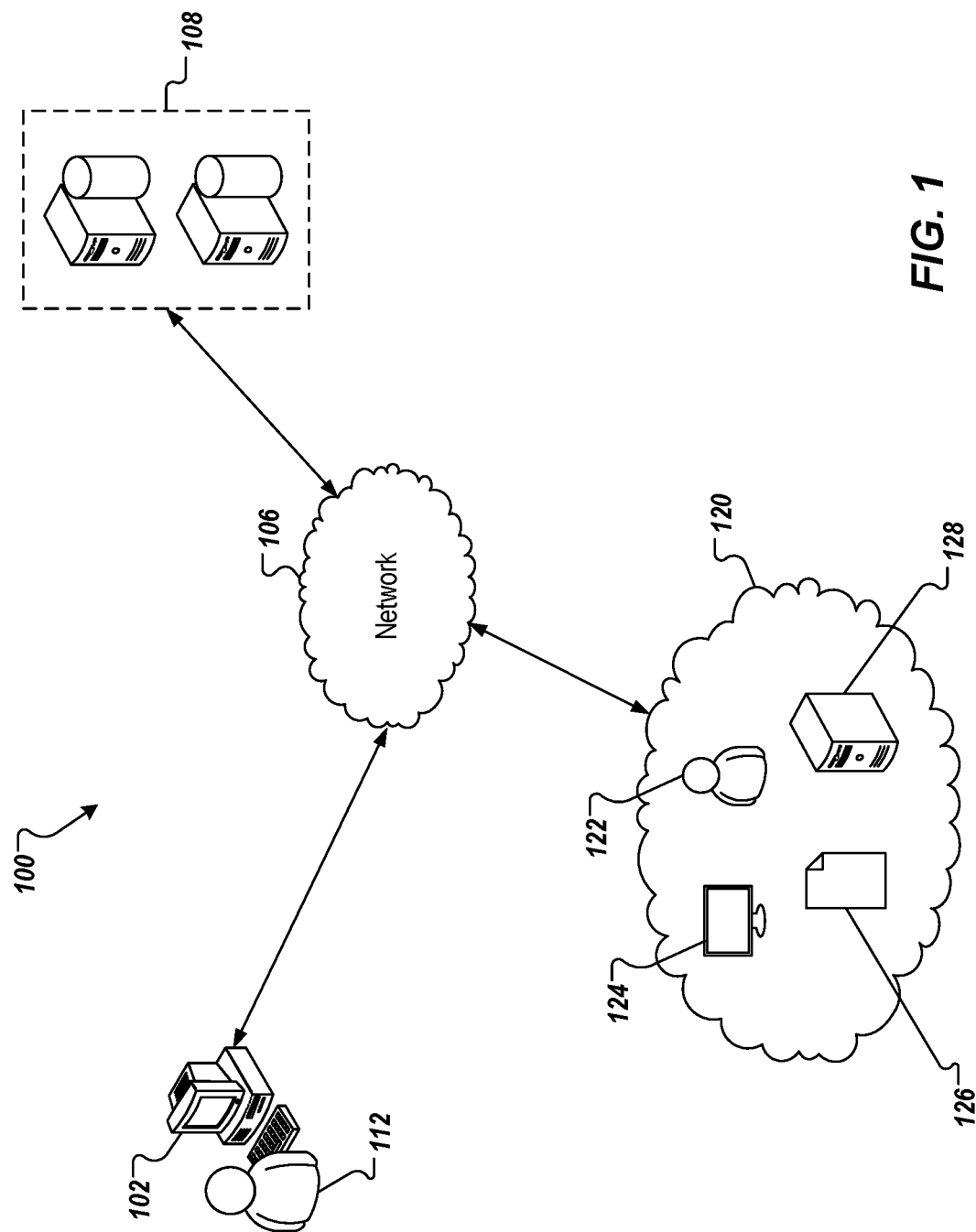
FIG. 1 depicts an example architecture that can be used to execute implementations of the present disclosure.

Implementations of the present disclosure are directed to generating process aware analytical attack graphs (AAGs) for enterprise-wide cyber-security in enterprise networks. More particularly, implementations of the present disclosure are directed to generating process aware AAGs through logical network analysis. Implementations of the present disclosure are also directed to using process aware AAGs for abstracting enterprise processes within enterprise networks. In some examples, implementations of the present disclosure are provided within an agile security platform that determines asset vulnerability of enterprise-wide assets including cyber-intelligence and discovery aspects of enterprise information technology (IT) systems and operational technology (OT) systems, asset value, potential for asset breach and criticality of attack paths towards target(s) including hacking analytics of enterprise IT/OT systems.

In some implementations, actions include receiving a AAG from computer-readable memory, generating from logical network ontology data, asset inventory data, and asset communication data, a logical topology of the enterprise network as a computer-readable data structure, defining, at least partially by executing community detection over the logical topology, a sub-set of groups within the enterprise network, each group representing a process of a plurality of process, each process being at least partially executed by one or more assets within the enterprise network, processing the AAG based on the sub-set of groups and data from one or more contextual data sources to provide the process aware AAG, the process aware AAG defining a mapping between an infrastructure-layer of the enterprise network and a process-layer of the enterprise network, storing the process aware AAG as a computer-readable data structure to computer-readable memory, and executing one or more remedial actions in the enterprise network in response to analytics executed on the process aware AAG.

In terms of cyber-security, modern computer networks are largely segregated and often deployed with diverse cyber defense mechanisms, which makes it challenging for an attacker (hacker) to gain direct access to a target (e.g., administrator credentials). This pattern is commonly seen in industrial control system (ICSs) where a layered architecture ensures that targets are not in close proximity to the perimeter. Despite the presence of a layered architecture, the spate of attacks is increasing rapidly and span from large enterprises to the critical infrastructure (CINF) networks. Due to the potential severe damage and cost experienced by a victim nation, CINFs have been intentionally targeted intentionally and have suffered from significant losses when successfully exploited.

In general, cyber-attacks occur in multiple stages. Consequently, detecting a single intrusion does not necessarily indicate the end of the attack as the attack could have progressed far deeper into the network. Accordingly, individual attack footprints are insignificant in an isolated manner, because each is usually part of a more complex multi-step attack. That is, it takes a sequence of steps to form an attack path toward a target in the network. Researchers have investigated several attack path analysis methods for identifying attacker's required effort (e.g., number of paths to a target and the cost and time required to compromise each path) to diligently estimate risk levels. However, traditional techniques fail to consider important features and provide incomplete solutions for addressing real attack scenarios. For example, some traditional techniques only consider the topological connection between stepping stones to measure the difficulty of reaching a target. As another example, some traditional techniques only assume some predefined attacker skill set to estimate the path complexity. In reality, an attacker's capabilities and knowledge of the enterprise network evolve along attack paths to the target.

In an effort to defend against cyber-attacks, AAGs can be generated, which represent potential lateral movements of adversaries within computer networks. An AAG can be used to understand how a computer network can be hacked and undesirable consequences that can result. Accordingly, AAGs can be described as an important tool in developing anti-hacker defenses. For example, an AAG can be used to identify the most vulnerable components within a computer network, and can be used to evaluate fixes of vulnerabilities that the AAG reveals (e.g., by fixing a limited number of issues, any adversary attack on the computer network, or on certain components in the computer network can be stopped).

Further, an enterprise executes multiple processes using an enterprise network as part of enterprise operations. Consequently, an enterprise can be described as conglomerate of its processes and can be viewed as composed of multiple abstract-layers. A first layer includes an abstract process-layer, which is related to all of the processes that make up the enterprise operations (e.g., processes performed using the enterprise network). Such processes can be executed by manual procedures (e.g., human interaction with information systems) and/or by automated actions performed by software components. Data collected during the processes could be used to provide intelligence as part of the abstract process-layer. A second layer includes an abstract infrastructure-layer that is made up of all infrastructure assets within the enterprise network (e.g., application servers and database servers, which host software components related to information systems, Internet-of-Things (IoT) devices and sensors, and other network related assets such as routers).

The digital-transformation era is characterized by the aspiration of enterprises to transform their core processes to be digitalized, which could yield opportunities to increase automation and enable real-time data-driven decision-making. On the other hand, this trend also creates challenges, such as exposure to cyber-security risks, transition from legacy systems to systems that support digital transformation and acquiring human resources with the appropriate skills.

Therefore, bridging the existing gap between the abstract process-layer to the abstract infrastructure-layer of the enterprise could support leveraging digital transformation challenges to opportunities. For example, providing context (e.g., business, financial context) to infrastructure assets could support implementation of agile-security approach driven by continuous prioritization of remedial actions given estimated impact of potential attack paths on enterprise operations, understanding processes from infrastructure-layer data will reduce dependence on a single information system and enable performing business-process analytics regardless of business-process aware systems existence; and facilitating IT operations in ever-changing environments.

The cyber-security community has presented techniques to represent infrastructure layer as a network of assets, to detect and perform simulation of potential attack paths in an enterprise network. However, mapping between infrastructure-layer to process-layer in an automatic manner is absent from traditional approaches. Further, traditional mapping of the relations between the two abstraction layers is resource-intensive and error prone. Also, the emergence of digital transformation driven by technology (e.g., 5G networks) will increase the dynamic relations between the two layers, exacerbating deficiencies of traditional approaches.

As noted above, an AAG of an enterprise network can be used to analyze and illustrate the possible vulnerabilities an attacker may exploit to perform lateral movements towards a pre-defined target (e.g., a "crown-jewel"). While AAGs are useful in defending against and/or mitigating occurrences of cyber-attacks, AAGs are typically complex graph structures that lack higher-level context of the overall enterprise operations. For example, while an AAG represents attack paths through an enterprise network, the AAG is absent information on what processes are at risk along any given path and/or the impact an attack path can have on enterprise operations. Further, as a graph structure, an AAG can include hundreds of thousands to millions of nodes and edges that can require a significant amount of technical resources for graph processing. This can be relatively burdensome, particularly because enterprise networks are dynamic and AAGs need to be frequently generated and processed to ensure analytics are conducted on the current state of the enterprise network. Lacking higher-level context, while AAGs enable assessment of risk, assessing the impact of cyber-attacks on enterprise operations, both in technical terms and financial terms, is elusive. Further, and given their relatively large size, AAGs can be difficult to make visually accessible to users (e.g., cyber-security personnel), while preserving key features (e.g., information that can inform cyber-security personnel of risk).

In view of the above context, implementations of the present disclosure are directed to generating process aware AAGs for enterprise-wide cyber-security in enterprise networks. More particularly, implementations of the present disclosure are directed to generating process aware AAGs through logical network analysis. Implementations of the present disclosure are also directed to using process aware AAGs for abstracting enterprise processes within enterprise networks.

As described herein, implementations of the present disclosure can be realized within an agile security platform that considers attack complexity within interconnected cyber infrastructures (enterprise networks) with a variety of attack paths to comprehensively address real attack scenarios. In general, the agile security platform provides a cyber-threat analysis framework based on characterizing adversarial behavior in a multi-stage cyber-attack process. As described in further detail herein, how a threat proceeds within a network is investigated using an AAG and all possible attack stages are identified. In some implementations, each stage can be associated with network attributes. Using a holistic view of threat exposure provided by AAGs, attack techniques and tactics are incorporated into steppingstones found in AAGs.

In further detail, the cyber-threat analysis framework adds context to each attack stage using a real-world knowledge base of adversary tactics and techniques to more comprehensively characterize progression along the attack path. In some implementations, an attack path analysis model identifies a level of difficulty in taking a path by considering the complexity of the path, the skill set of the attacker, and the like. Implementations of the present disclosure provide a path hardness that is measured in terms of a capability of the attacker and challenges. The insight into the level of difficulty of an attack path in the network helps security administrators to pinpoint critical paths and prioritize path hardening actions.

As described herein, the agile security platform enables continuous cyber and enterprise-operations alignment controlled by risk management. The agile security platform improves decision-making by helping enterprises to prioritize security actions that are most critical to their operations. In some examples, the agile security platform combines methodologies from agile software development lifecycle, IT management, development operations (DevOps), and analytics that use artificial intelligence (AI). In some examples, agile security automation bots continuously analyze attack probability, predict impact, and recommend prioritized actions for cyber risk reduction. In this manner, the agile security platform enables enterprises to increase operational efficiency and availability, maximize existing cyber-security resources, reduce additional cyber-security costs, and grow organizational cyber resilience.

As described in further detail herein, the agile security platform provides for discovery of IT/OT supporting elements within an enterprise, which elements can be referred to as configuration items (CI). Further, the agile security platform can determine how these CIs are connected to provide a CI network topology. In some examples, the CIs are mapped to processes and services of the enterprise, to determine which CIs support which services, and at what stage of an operations process. In this manner, a services CI topology is provided.

In some implementations, the specific vulnerabilities and improper configurations of each CI are determined and enable a list of risks to be mapped to the specific IT/OT network of the enterprise. Further, the agile security platform of the present disclosure can determine what a malicious user (hacker) could do within the enterprise network, and whether the malicious user can leverage additional elements in the network such as scripts, CI configurations, and the like. Accordingly, the agile security platform enables analysis of the ability of a malicious user to move inside the network, namely, lateral movement within the network. This includes, for example, how a malicious user could move from one CI to another CI, what CI (logical or physical) can be damaged, and, consequently, damage to a respective service provided by the enterprise.

FIG. 1 depicts an example architecture 100 in accordance with implementations of the present disclosure. In the depicted example, the example architecture 100 includes a client device 102, a network 106, and a server system 108. The server system 108 includes one or more server devices and databases (e.g., processors, memory). In the depicted example, a user 112 interacts with the client device 102.

In some examples, the client device 102 can communicate with the server system 108 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 108 includes at least one server and at least one data store. In the example of FIG. 1, the server system 108 is intended to represent various forms of servers including, but not limited to a web server, an application server, a proxy server, a network server, and/or a server pool. In general, server systems accept requests for application services and provides such services to any number of client devices (e.g., the client device 102 over the network 106). In accordance with implementations of the present disclosure, and as noted above, the server system 108 can host an agile security platform.

In the example of FIG. 1, an enterprise network 120 is depicted. The enterprise network 120 represents a network implemented by an enterprise to perform its operations. In some examples, the enterprise network 120 represents on-premise systems (e.g., local and/or distributed), cloud-based systems, and/or combinations thereof. In some examples, the enterprise network 120 includes IT systems and OT systems. In general, IT systems include hardware (e.g., computing devices, servers, computers, mobile devices) and software used to store, retrieve, transmit, and/or manipulate data within the enterprise network 120. In general, OT systems include hardware and software used to monitor and detect or cause changes in processes within the enterprise network 120 as well as store, retrieve, transmit, and/or manipulate data. In some examples, the enterprise network 120 includes multiple assets. Example assets include, without limitation, users 122, computing devices 124, electronic documents 126, and servers 128.

In some implementations, the agile security platform is hosted within the server system 108, and monitors and acts on the enterprise network 120, as described herein. More particularly, and as described in further detail herein, one or more AAGs representative of the enterprise network are generated in accordance with implementations of the present disclosure. For example, the agile security platform detects IT/OT assets and generates an asset inventory and network maps, as well as processing network information to discover vulnerabilities in the enterprise network 120.

In some examples, the agile security platform provides one or more dashboards, alerts, notifications and the like to cyber-security personnel that enable the cyber-security personnel to react to and remediate security relevant events. For example, the user 112 can include a cyber-security expert that views and responds to dashboards, alerts, and/or notifications of the agile security platform using the client device 102.

In accordance with implementations of the present disclosure, the agile security platform operates over multiple phases. Example phases include an asset discovery, anomaly detection, and vulnerability analysis phase, a cyber resilience risk analysis phase, and a cyber resilience risk recommendation phase.

With regard to the asset discovery, anomaly detection, and vulnerability analysis phase, discovering what vulnerabilities exit across the vertical stack and the relevant use cases is imperative to be conducted from the enterprise IT to the control systems. A focus of this phase is to generate the security backlog of issues, and potential remediations.

Rather than managing each technology layer separately, the agile security platform addresses lateral movements across the stack. Through devices, communication channels (e.g., email, TCP/IP), and/or operation systems, vulnerabilities are addressed within the context of a service (e.g., a service that the enterprise offers to customers), and a cyber kill chain to a target in the operation vertical, generating operation disturbance by manipulation of data. The notion of a CI assists in mapping dependencies between IT/OT elements within a configuration management DB (CMDB). A so-called security CI (SCI) maps historical security issues of a certain managed security element and is mapped into a security aspect of a digital twin.

As a result, a stack of technologies is defined, and is configured in a plug-in reference architecture (replaceable and extensible) manner. The stack addresses different aspects of monitoring, harvesting, and alerting of information within different aggregations views (dashboards) segmented according to owners and relevant IT and security users. An example view includes a health metric inserted within the dashboard of an enterprise application. In some examples, the health metric indicates the security condition of the underlying service and hence, the reliability of the provided data and information. Similar to risks that can be driven by labor, inventory, or energy, security risk concern can be presented and evaluated in the operations-level, drilled-through for additional transparency of the issue, and can be optimally remediated by allocating investments to automation or to security and IT personal with adequate operations awareness.

With regard to the cyber resilience risk analysis phase, each vulnerability may have several remediations, and each has a cost associated with it, either per internal personnel time, transaction, service, or retainer, as well as the deferred cost of not acting on the issue. A focus of this phase is to enable economical decision-making of security investments, either to be conducted by the IT and security team or directly by automation, and according to risk mitigation budget.

In further detail, observing a single-issue type and its remediations does not reflect the prioritization between multiple vulnerabilities. Traditional systems are based on global risk assessment, yet the context in which the SCI is part of is missing. The overall risk of a process matters differently for each enterprise. As such, remediation would occur according to gradual hardening of a process according to prioritization, driven in importance and responsibility by the enterprise, not by gradual hardening of all devices, for example, in the organization according to policy, without understanding of the impact on separated operational processes. Hardening of a system should be a decision of the enterprise to drive security alignment with the enterprise.

In addition, as the system is changed by gradual enforcement and hardening, new issues are detected and monitored. Hence, making a big bang decision may be not relevant to rising risks as they evolve. Prioritization according to value is the essence of this phase. It is a matter of what is important for the next immediate term, according to overall goals, yet considering changes to the environment.

With regard to the cyber resilience risk recommendation phase, a focus is to simplify approved changes and actions by proactive automation. In traditional systems, the action of IT remediation of security issues is either done by the security team (such as awareness and training), by creating a ticket in the IT service system (call for patch managements), and/or by tools that are triggered by security and monitored by IT (automatic deployment of security policies, change of authentication and authorization, self-service access control management, etc.). Some operations can be conducted in a disconnected mode, such as upgrading firmware on an IoT device, in which the operator needs to access the device directly. Either automated or manual, by IT or by security, or by internal or external teams, the entire changes are constantly assessed by the first phase of discovery phase, and re-projected as a metric in a context. Progress tracking of these changes should also occur in a gradual manner, indicating maintenance scheduling on similar operational processes, hence, driving recommendations for frequent actions that can be automated, and serve as candidates to self-managed by the operations owners and systems users.

In the agile security platform, acting is more than automating complex event processing (CEP) rules on alerts captured in the system logs and similar tools. Acting is started in areas highlighted according to known patterns and changing risks. Pattern detection and classification of events for approved automation processes (allocated transactions budget), are aimed at commoditization of security hardening actions in order to reduce the attention needed for prioritization. As such, a compound backlog and decision phase, can focus further on things that cannot be automated versus those that can. All issues not attended yet are highlighted, those that are handled by automation are indicated as such, and monitored to completion, with a potential additional value of increasing prioritization due to changing risks impact analysis.

Figure 2:
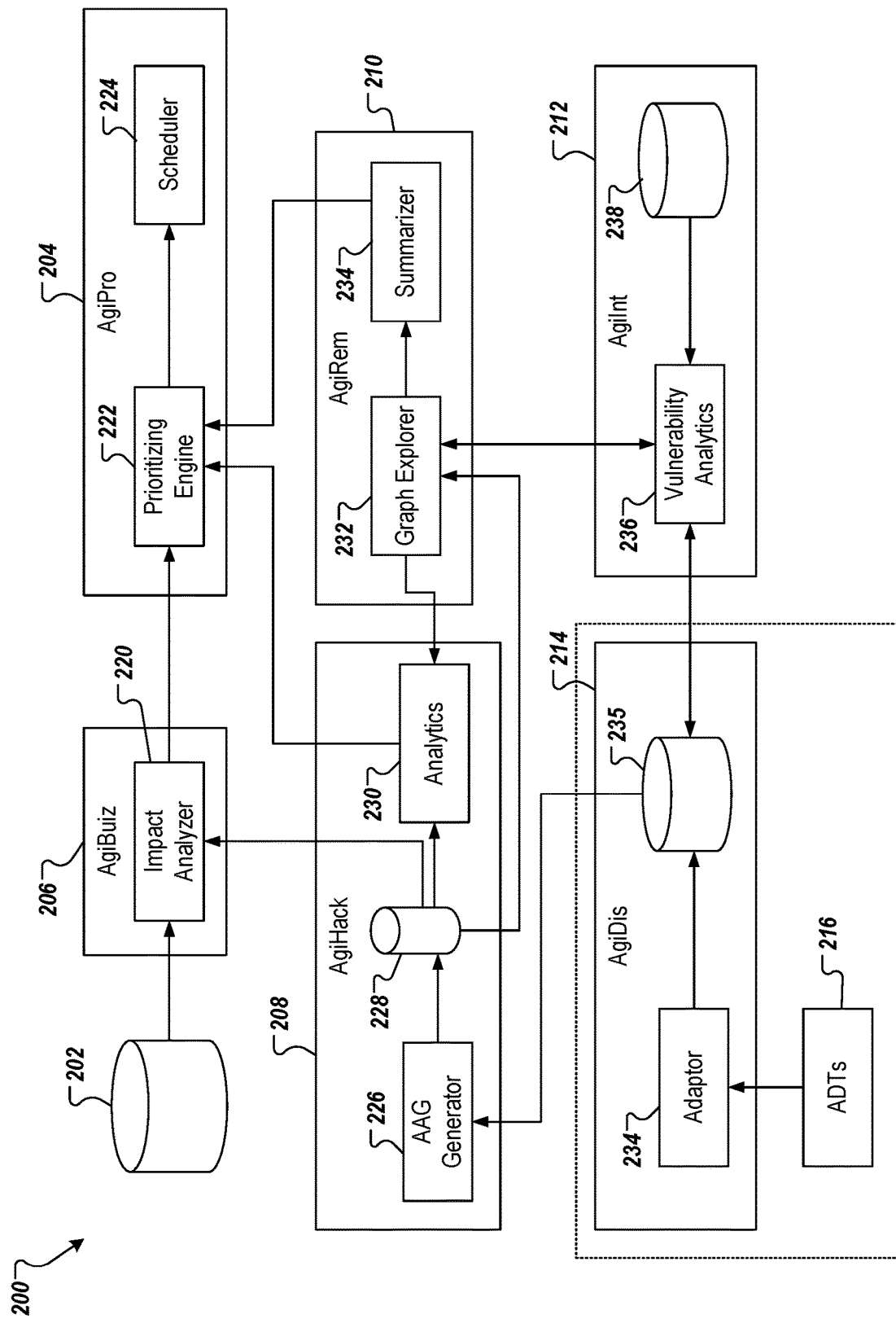
FIG. 2 depicts an example conceptual architecture of an agile security platform.

FIG. 2 depicts an example conceptual architecture 200 of an agile security (AgiSec) platform. The conceptual architecture 200 depicts a set of security services of the AgiSec platform, which include: an agile security prioritization (AgiPro) service 204, an agile security business impact (AgiBuiz) service 206, an agile security remediation (AgiRem) service 210, an agile security hacker lateral movement (AgiHack) service 208, an agile security intelligence (AgiInt) service 212, and an agile security discovery (AgiDis) service 214. The conceptual architecture 200 also includes an operations knowledge base 202 that stores historical data provided for an enterprise network (e.g., the enterprise network 120).

In the example of FIG. 2, the AgiDis service 214 includes an adaptor 234, and an asset/vulnerabilities knowledge base 235. In some examples, the adaptor 234 is specific to an asset discovery tool (ADT) 216. Although a single ADT 216 is depicted, multiple ADTs can be provided, each ADT being specific to an IT/OT site within the enterprise network. Because each adaptor 234 is specific to an ADT 216, multiple adaptors 234 are provided in the case of multiple ADTs 216.

In some implementations, the AgiDis service 214 detects IT/OT assets through the adaptor 234 and respective ADT 216. In some implementations, the AgiDis service 214 provides both active and passive scanning capabilities to comply with constraints, and identifies device and service vulnerabilities, improper configurations, and aggregate risks through automatic assessment. The discovered assets can be used to generate an asset inventory, and network maps. In general, the AgiDis service 214 can be used to discover assets in the enterprise network, and a holistic view of network and traffic patterns. More particularly, the AgiDis service 214 discovers assets, their connectivity, and their specifications and stores this information in the asset/vulnerabilities knowledge base 235. In some implementations, this is achieved through passive network scanning and device fingerprinting through the adaptor 234 and ADT 216. The AgiDis service 214 provides information about device models.

In the example of FIG. 2, the AgiInt service 212 includes a vulnerability analytics module 236 and a threat intelligence knowledge base 238 (e.g., CVE, CAPEC, CWE, iDefence API, vendor-specific databases). In some examples, the AgiInt service 212 discovers vulnerabilities in the enterprise network based on data provided from the AgiDis service 214. In some examples, the vulnerability analytics module 236 processes data provided from the AgiDis service 214 to provide information regarding possible impacts of each vulnerability and remediation options (e.g., permanent fix, temporary patch, workaround) for defensive actions. In some examples, the vulnerability analytics module 236 can include an application programming interface (API) that pulls out discovered vulnerabilities and identifies recommended remediations using threat intelligence feeds. In short, the AgiInt service 212 maps vulnerabilities and threats to discovered IT/OT assets. The discovered vulnerabilities are provided back to the AgiDis service 214 and are stored in the asset/vulnerabilities knowledge base 235 with their respective assets.

In the example of FIG. 2, the AgiHack service 208 includes an analytical attack graph (AAG) generator 226, an AAG database 228, and an analytics module 230. In general, the AgiHack service 208 generates AAGs using the resource-efficient AAG generation, and evaluates hacking exploitation complexity. In some examples, the AgiHack service 208 understands attack options, leveraging the vulnerabilities to determine how a hacker would move inside the network and identify targets for potential exploitation. The AgiHack service 208 proactively explores adversarial options and creates AAGs representing possible attack paths from the adversary's perspective.

In further detail, the AgiHack service 208 provides rule-based processing of data provided from the AgiDis service 214 to explore all attack paths an adversary can take from any asset to move laterally towards any target (e.g., running critical operations). In some examples, multiple AAGs are provided, each AAG corresponding to a respective target within the enterprise network. Further, the AgiHack service 208 identifies possible impacts on the targets. In some examples, the AAG generator 226 uses data from the asset/vulnerabilities knowledge base 236 of the AgiDis service 214, and generates an AAG. In some examples, the AAG graphically depicts, for a respective target, all possible impacts that may be caused by a vulnerability or network/system configuration, as well as all attack paths from anywhere in the network to the respective target. In some examples, the analytics module 230 processes an AAG to identify and extract information regarding critical nodes, paths for every source-destination pair (e.g., shortest, hardest, stealthiest), most critical paths, and critical vulnerabilities, among other features of the AAG. If remediations are applied within the enterprise network, the AgiHack service 208 updates the AAG.

In the example of FIG. 2, the AgiRem service 210 includes a graph explorer 232 and a summarizer 234. In general, the AgiRem service 210 provides remediation options to avoid predicted impacts. For example, the AgiRem service 210 provides options to reduce lateral movement of hackers within the network and to reduce the attack surface. The AgiRem service 210 predicts the impact of asset vulnerabilities on the critical processes and adversary capabilities along kill chain/attack paths and identifies the likelihood of attack paths to access critical assets and prioritizes the assets (e.g., based on shortest, easiest, stealthiest). The AgiRem service 210 identifies remediation actions by exploring attack graph and paths. For example, the AgiRem service 210 can execute a cyber-threat analysis framework that characterizes adversarial behavior in a multi-stage cyber-attack process, as described in further detail herein.

In further detail, for a given AAG (e.g., representing all vulnerabilities, network/system configurations, and possible impacts on a respective target) generated by the AgiHack service 208, the AgiRem service 210 provides a list of efficient and effective remediation recommendations using data from the vulnerability analytics module 236 of the AgiInt service 212. In some examples, the graph explorer 232 analyzes each feature (e.g., nodes, edges between nodes, properties) to identify any condition (e.g., network/system configuration and vulnerabilities) that can lead to cyber impacts. Such conditions can be referred to as issues. For each issue, the AgiRem service 210 retrieves remediation recommendations and courses of action (CoA) from the AgiInt service 212, and/or a security knowledge base (not shown). In some examples, the graph explorer 232 provides feedback to the analytics module 230 for re-calculating critical nodes/assets/paths based on remediation options. In some examples, the summarizer engine 234 is provided as a natural language processing (NLP) tool that extracts concise and salient text from large/unstructured threat intelligence feeds. In this manner, the AgiSec platform can convey information to enable users (e.g., security teams) to understand immediate remediation actions corresponding to each issue.

In the example of FIG. 2, the AgiBuiz service 206 includes an impact analyzer 220. In general, the AgiBuiz service 206 associates services that are provided by the enterprise with IT/OT assets, generates a security map, identifies and highlights risks and possible impacts on enterprise operations and industrial processes, and conducts what-if prediction analyses of potential security actions remediations on service health levels. In other words, the AgiBuiz service 206 identifies risk for each impact predicted by the AgiHack service 208. In some examples, the impact analyzer 220 interprets cyber risks and possible impacts (e.g., financial risk) based on the relative importance of each critical asset and its relative value within the entirety of the enterprise operations. The impact analyzer 220 processes one or more models to compare the financial risks caused by cyber attacks with those caused by system unavailability due to shutdown time for replacing/patching critical assets.

In the example of FIG. 2, the AgiPro service 204 includes a prioritizing engine 222 and a scheduler 224. In some implementations, the AgiPro service 204 prioritizes the remediation recommendations based on their impact on the AAG size reduction and risk reduction on the value. In some examples, the AgiPro service 204 determines where the enterprise should preform security enforcement first, in order to overall reduce the risks discovered above, and evaluate and probability to perform harm based on the above lateral movements by moving from one CI to another. In some examples, the AgiPro service 204 prioritizes remediation actions based on financial risks or other implications, provides risk reduction recommendations based on prioritized remediations, and identifies and tracks applied remediations for risks based on recommendations.

In some examples, the prioritizing engine 222 uses the calculated risks (e.g., risks to regular functionality and unavailability of operational processes) and the path analysis information from the analytics module 230 to prioritize remediation actions that reduce the risk, while minimizing efforts and financial costs. In some examples, the scheduler 224 incorporates the prioritized CoAs with operational maintenance schedules to find the optimal time for applying each CoA that minimizes its interference with regular operational tasks.

As introduced above, cyber-threat analysis for a computer network leverages one or more AAGs. In some examples, an AAG is generated by a cyber-security platform, such as the AgiSec platform described herein. In mathematical terms, an AAG can be described as a directed graph modeled as $G(V,E)$ with a set of nodes $V=\{v_1, \ldots, v_n\}$ and a set of edges $E=\{e_1, \ldots, e_m\}$ connecting nodes together, where $|V|=n$ and $|E|=m$.

Figure 3:
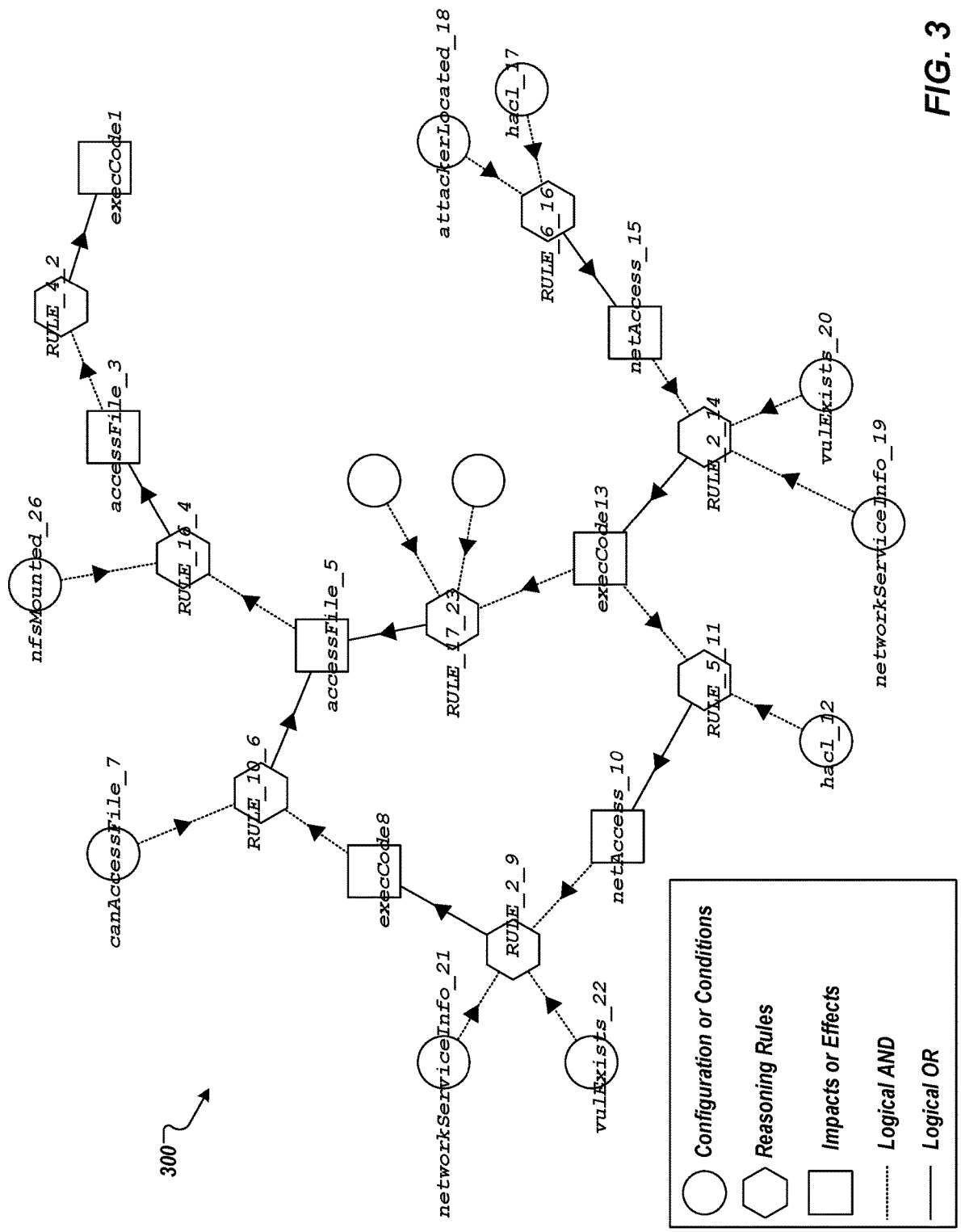
FIG. 3 depicts an example portion of an example analytical attack graph (AAG) to illustrate implementations of the present disclosure.

FIG. 3 depicts an example portion 300 of an example AAG to illustrate implementations of the present disclosure. As depicted in the example of FIG. 3, the AAG can include different node types to show how a set of network and system configurations result in unauthorized actions to specific targets. The example portion 300 is depicted in a database structure (e.g., Neo4j graph database structure). Nodes in an AAG are of different types: circular nodes representing system or network configurations that are the conditions that provide possibilities for actions by an attacker; hexagonal nodes representing reasoning rules that represent the attack methodology leveraged by an attacker to achieve a particular goal; and square nodes that represent an impact as a sub-goal for a certain action an attacker could take. The AAG includes two types of edges: configuration-to-rule edges that represent logical AND (i.e., all configuration conditions have to be true to cause the impact; and rule-to-impact edges that represent logical OR (i.e., the impact happens if at least one rule is satisfied).

In general, the AAG is created by taking into account the configurations directed by some rules in order to make some impacts on the target network. In some examples, all configuration nodes, impact nodes, and rule nodes can be provided in sets C, I, R, respectively. Accordingly, $C=\{c_j|c_j \in V, \forall c_j \text{ is a configuration}\}$, $I=\{i_j|i_j \in V, \forall i_j \text{ is an impact}\}$, and $R=\{r_j|r_j \in V, \forall r_j \text{ is a rule}\}$. Consequently, the combination of these sets accounts for all vertices of the graph $G$ (i.e., $V=\{C, I, R\}$).

AAGs can be used in cyber-threat analysis to determine attack paths of external attackers into and through a computer network. Use of AAGs in mitigating attacks on computer networks is described in further detail in commonly assigned U.S. application Ser. No. 16/554,846, entitled Generating Attack Graphs in Agile Security Platforms, and filed on Aug. 29, 2019, the disclosure of which is expressly incorporated herein by reference in the entirety for all purposes. Example generation of AAGs is also described in further detail in commonly assigned U.S. application Ser. No. 16/924,483, entitled Resource-efficient Generation of Analytical Attack Graphs, and filed on Jul. 9, 2020, the disclosure of which is expressly incorporated herein by reference in the entirety for all purposes.

As introduced above, and as represented by way of example in FIG. 3, an AAG includes multiple types of nodes, which include configurations, rules, and impacts. In some examples, a configuration represents facts about the existing computer configuration (e.g., a certain user exists on the computer, the computer has a certain vulnerability). In some examples, a rule represents a combination of all incoming configurations and impacts. Because configurations are facts, there is no requirement that they be satisfied. However, all incoming impacts would need to be satisfied, meaning that an adversary has to achieve the impacts to be successful in lateral movement. In some examples, an impact represents the actual action on a component that the adversary can achieve. In order to achieve such an action, the adversary has to comply with all of the requirements of the incoming rule node, as well as edges (e.g., hops/lateral movements of the adversary in the computer network).

Figure 4:
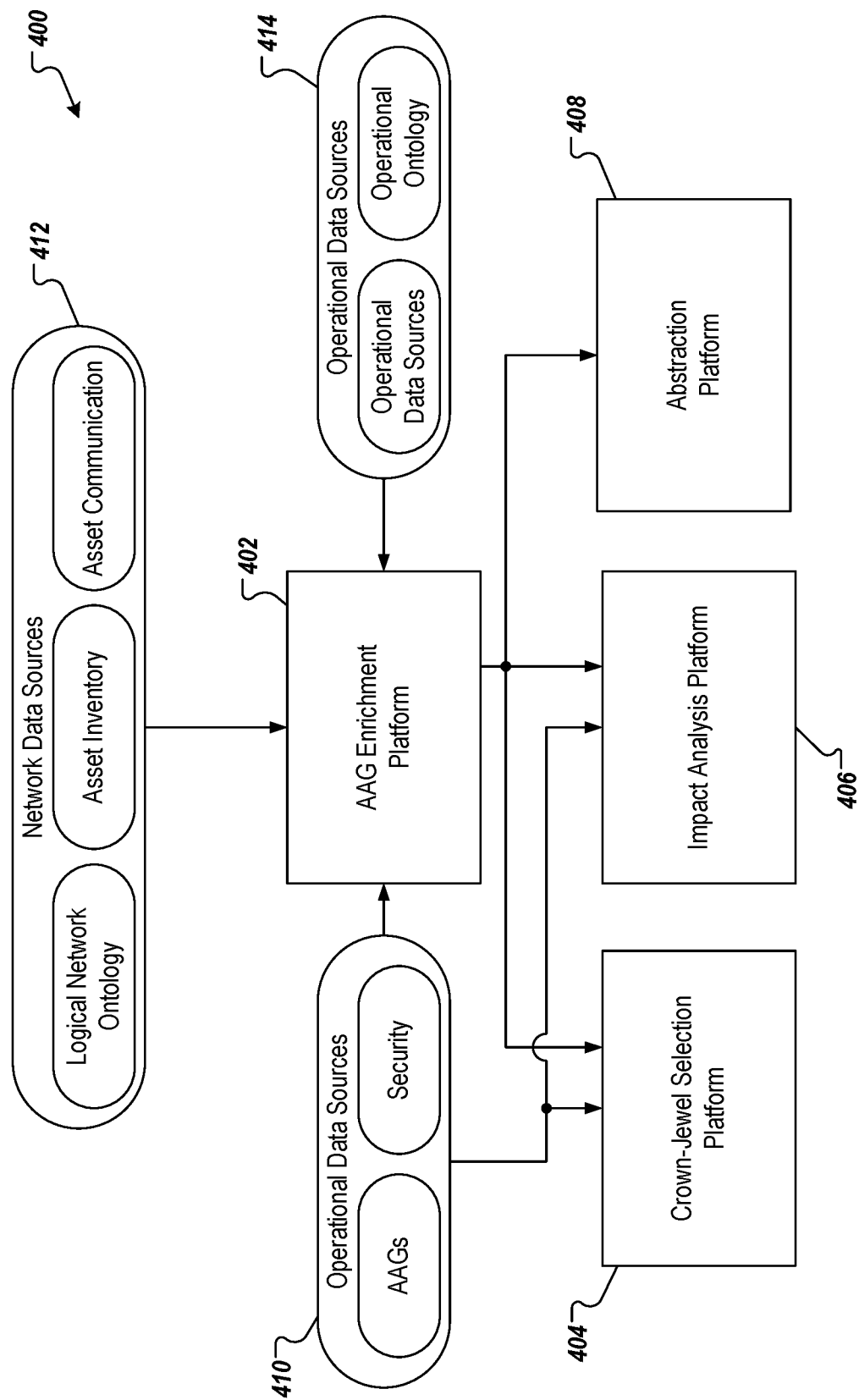
FIG. 4 depicts a high-level conceptual architecture in accordance with implementations of the present disclosure.

FIG. 4 depicts a high-level conceptual architecture 400 in accordance with implementations of the present disclosure. In the example of FIG. 4, the conceptual architecture 400 includes an AAG enrichment platform 402, a crown-jewel selection platform 404, an impact analysis platform 406, and an abstraction platform 408. The conceptual architecture 400 further includes an AAG system 410, an enterprise network information system 412, and an enterprise operations information system 414.

In some implementations, and as described in further detail herein, the AAG enrichment platform 402 receives an AAG from the AAG system 410, enterprise network data from the enterprise network information system 412, and operations data from the enterprise operations information system 414, and generates a process aware AAG (also referred to as an enriched AAG) based thereon. In some implementations, the crown-jewel selection platform 404 receives an enriched AAG from the AAG enrichment platform 402 and vulnerability data associated with an AAG underlying the process aware AAG from the AAG system 410 and provides a set of recommended crown-jewels within the enterprise network. In some examples, the vulnerability data includes vulnerability scores generated using the Common Vulnerability Scoring System (CVSS).

In some implementations, the impact analysis platform 406 receives a process aware AAG from the AAG enrichment platform 402 and vulnerability data associated with an AAG underlying the process aware AAG from the AAG system 410 and provides an impact analysis over multiple AAG-related entities to assess an impact assets each have on enterprise operations (e.g., processes), if an asset were to be compromised. In some implementations, and as described in further detail herein, the abstraction platform 408 receives a process aware AAG and provides an abstracted graph, in which each node is a group within an enterprise and edges between nodes represent associations between groups within the enterprise network.

Figure 5:
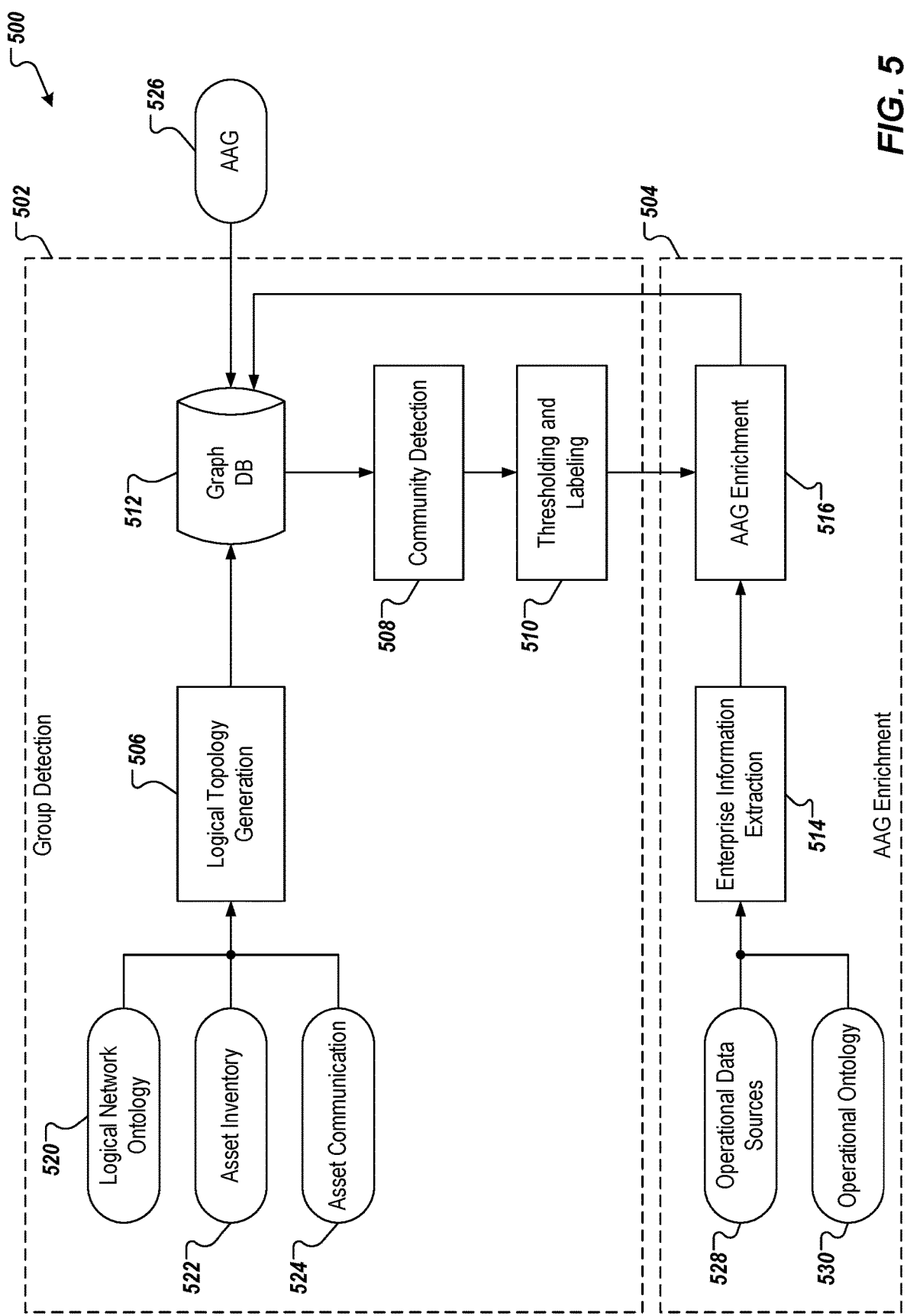
FIG. 5 depicts an example architecture for a process aware AAG generation platform in accordance with implementations of the present disclosure.

FIG. 5 depicts an example architecture for an AAG enrichment platform 500 (e.g., the AAG enrichment platform 402 of FIG. 4) in accordance with implementations of the present disclosure. The AAG enrichment platform 500 integrates several data sources to map between the infrastructure-layer and the process-layer and uses the mapping to provide a process aware AAG (also referred to as an enriched AAG). The process aware AAG can be described as an AAG (e.g., from the AAG system 410) that is enriched with information representative of enterprise operations (also referred to as processes). The process aware AAG can be applied in multiple use-cases as described herein.

In the example of FIG. 5, the AAG enrichment platform 500 includes group detection 502 and AAG enrichment 504. The group detection 502 includes a logical topology generation module 506, a community detection module 508, a thresholding and labeling module 510, and a graph database (DB) 512. As described in further detail herein, the group detection 502 processes logical ontology data 520, asset inventory data 522, asset communication data 524, and an AAG 526 to provide an asset-to-process mapping that is input to the AAG enrichment 504. In the example of FIG. 5, the AAG enrichment 504 includes an enterprise information extraction module 514 and an AAG enrichment module 516. As described in further detail herein, the AAG enrichment 504 processes operation data sources data 528, operational ontology data 530, and the asset-to-process mapping to provide a process aware AAG, which is stored in the graph DB 512.

In further detail, the logical topology generation module 506 receives the logical network ontology data 520, the asset inventory data 522, and the asset communications data 524. In general, the logical network ontology data 520 can be described as being representative of a specification for assets and relationships between assets in the domain of enterprise networks. The asset inventory data 522 and the asset communications data 524 can be described as facts that represent actual (real-world) instances of assets and communications between assets within an enterprise network.

In some examples, the logical network ontology data 520 is representative of an ontology applicable to enterprise networks and generally includes concepts and relations that describe components, features, and behaviors of the network layer and elements of the data-link and physical layer of the enterprise network. In some examples, the logical network ontology data 520 describes a traffic concept of communication between assets, the resources involved and its distribution over the enterprise network. In some examples, the logical network ontology data 520 describes tools and services that are implemented within the enterprise network for monitoring and control. In some examples, the asset inventory data 522 includes information regarding tangible assets within an enterprise network that would be the base for extracting asset properties (also referred to as significant properties) of each asset. In some examples, asset communications data 524 includes, without limitation, information regarding communication of assets (e.g., pcap files) that can be used to extract associations between assets. In some examples, the asset communications data 524 represents actual, historical interactions between assets within the enterprise network, and is provided in a graph structure, where each node is an asset within the enterprise network with respect to asset properties (e.g., IP address, MAC address, OS, list of services, user privileges, etc.), and each edge represents an interaction between assets. In some examples, assets can communicate with each other through different application layer protocols, each communication type will be an association (edge) between assets with respect to its significant properties. An example property can include, without limitation, transportation data volume (e.g. volume of data transferred per period).

In some implementations, logical topology generation is performed by the logical topology generation module 506 to retrieve specifications (e.g., from the logical network ontology) and facts (e.g., from the asset inventory, the asset communication) and generate a graph representation of an enterprise logical topology. For example, for each asset in the asset inventory data 522, a node can be provided in the logical topology, and metadata can be associated with the node that describes properties of the assets (e.g., asset type from ontology, OS, IP address). For instances of communication between assets represented in the asset communications data 524, an edge can be provided between respective nodes, and metadata can be associated with the edge that describes properties of the communications (e.g., protocol, individual properties, aggregate properties). In some examples, individual properties can include properties of a single instance of communication between assets. In some examples, aggregate properties can include an aggregation over multiple instances of communication (e.g., minimum/maximum/average packet rate and/or bit rate).

Figure 6:
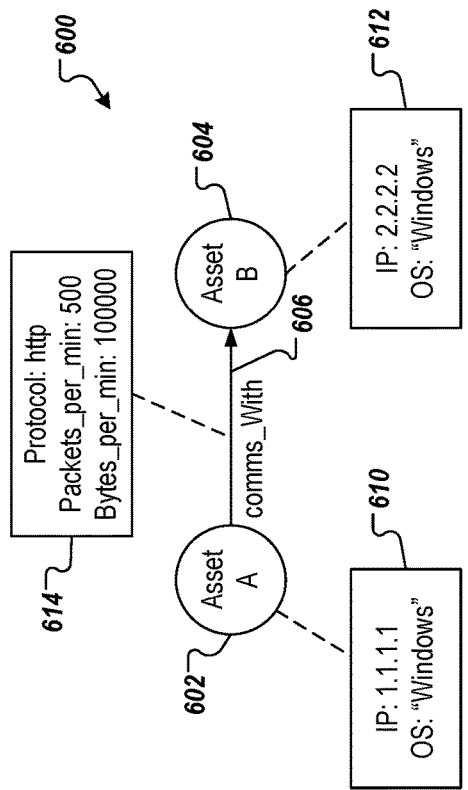
FIG. 6 depicts an example representation of a logical topology in accordance with implementations of the present disclosure.

FIG. 6 depicts an example graph representation of a logical topology 600 in accordance with implementations of the present disclosure. The logical topology 600 is represented in a graph structure. For example, the logical topology 600 of FIG. 6 can be generated by the logical topology generation module 506 based on the logical network ontology data 520, the asset inventory data 522, and the asset communications data 524. It is contemplated, however, that logical topologies can be represented in any appropriate data structure (e.g., tabular). In the example of FIG. 6, the logical topology 600 includes a first node 602, a second node 604, and an edge 606. The first node 602 represents a first asset (Asset A), the second node 604 represents a second asset (Asset B), and the edge 606 represents a relationship between the assets. In the example of FIG. 6, the edge 606 represents a relationship that the first asset communicates with the second asset. It is appreciated that the logical topology 600 of FIG. 6 is relatively simple and represents a small portion of an enterprise network to illustrate implementations of the present disclosure.

The logical topology 600 further includes a set of properties 610 associated with the first node 602, a set of parameters 612 associated with the second node 604, and a set of properties associated with the edge 606. In the depicted example, the sets of properties 610, 612 provide metadata detailing information on the first asset and the second asset represented by the first node 602 and the second node 604, respectively. The set of properties 614 provides metadata detailing information on the relationship represented by the edge 606.

In some examples, community detection is executed by the community detection module 508 to detect and identify groups within the enterprise network as represented by the logical network topology (e.g., provided from the logical topology generation module 506). Here, the intuition is that community detection over a logical network topology will output groups of assets that share a strong process connection (e.g., have some relationship to one another in execution of a process underlying enterprise operations). Multiple groups can be provided and each group is described by an informative description that is extracted based on information regarding its cardinal asset(s). Accordingly, for a logical network topology, an output of the community detection module 508 is a set of groups, and, for each group, a set of assets included in the group. In some instances, an asset can be included in multiple groups (e.g., an asset that is implicated during execution of multiple processes).

In some examples, the community detection module 508 executes group detection using a community detection algorithm. An example community detection algorithm includes, without limitation, Louvain community detection (LCD), which can be described as a hierarchical clustering algorithm, that recursively merges communities into a single node and executes modularity clustering on condensed graphs. An objective of LCD is to maximize modularity scores (e.g., each in a range of [−1, 1]) that are calculated for each community. The modularity scores represent a relative density of edges inside communities with respect to edges outside communities. The modularity score can be described as representative of a quality of a partition, which is a division of a network into multiple communities (groups). In some examples, if a modularity score is equal to or below a first value (e.g., is equal to −0.5), the partitioning of the network being considered is non-modular. If the modularity score is equal to or above a second value (e.g., is equal to 1), the partitioning of the network being considered is fully modular. In detecting groups (communities), the starting point for LCD is to consider each node (asset) as a community. For each iteration of multiple iterations, a node i is clustered to a community that provides a maximal gain in modularity score among a plurality of communities. In some examples, the final partition is achieved when a maximal gain in modularity scores, if partitioning were to continue, is less than a threshold gain ($\varepsilon$).

In some implementations, the thresholding and labeling module 510 processes the output of the community detection module 508 to define a sub-set of groups. In some examples, the thresholding and labeling module 510 evaluates a quality of groups in the set of groups output by the community detection module 508 and, each group that is determined to have a sufficient quality is included in the sub-set of groups. In further detail, and in some examples, the quality of a group is determined based on a set of measures. Example measures include, without limitation, conductance and normalized cut. In some examples, if both conductance and normalized cut of a group are below a threshold (e.g., 0.5), the group is included in the sub-set of groups.

In some examples, conductance is determined as a fraction of total edge volume that points outside of the group. In general, conductance can be described as a measure of the fraction of total edge volume that points outside of a cluster (group, community), and can be calculated using the following example relationship:

$$f_{cond}(S) = \frac{c}{(2m+c)}$$

where S is the set of nodes in the community, m the number of edges in S, and c is the number of edges on the boundary of S (i.e., edges to nodes outside of the community). In some examples, normalized cut is determined as a normalized fraction of existing edges leaving the group out of all of the group's edges. Normalized cut can be calculated using the following example relationship:

$$f_{ncut}(S) = \frac{c}{2m+c} + \frac{c}{2(m_{tot}-m)+c}$$

where $m_{tot}$ is the total number of edges in the graph.

In some implementations, each group in the sub-set of groups can be assigned a label that is descriptive of a process that the group is associated with (e.g., a process that assets within the group support). Example processes can include, without limitation, customer relationship management (CRM) processes, enterprise resource planning (ERP) processes, and human capital management (HCM) processes. In some examples, groups in the sub-set of groups can be displayed to a user and the user can provide input assigning a label to each group.

In some examples, labels can be selected for groups using one or more machine learning (ML) models. For example, historical data representative of features of groups, each group being associated with a label, can be used to train one or more ML models. An example ML model can include, without limitation, a classification algorithm (e.g., support vector machine, decision tree classifier, random forest, neural network) that receives input data and provides output data representative of a class, which can be associated with a label. In some examples, features of groups can include, without limitation, semantic features (e.g., number of connections between assets, types of connections between assets) and asset metadata features (e.g., type of asset, OS). For example, a set of features for a group of the sub-set of groups can be provided as input data to a ML model, which provides a class as output data, and a label associated with the class is used to label the group.

In accordance with implementations of the present disclosure, the AAG enrichment 504 processes the sub-set of groups (e.g., provided from the thresholding and labeling module 510 of the group detection 502) and data from the operational data sources 528 and operational ontology data 530 to provide a process aware AAG. In some examples, the operational data sources 528 include financial data and operational data. Example financial data can include, without limitation, information regarding financial cost for executing respective processes and financial gain (e.g., profits) for executing respective processes (e.g., CRM process downtime cost of $10,000 per day). In general, the financial data represents: process has a financial value to the organization; multiple assets participate within a process, and each asset contributes differently to the value of the process; each asset has different recovery-time, and down-time and cost with respect to the contribution of the asset to the value of the process. Example operational data can include, without limitation, asset recovery time, asset recovery resource expenditure (e.g., memory, processing, bandwidth to be expended to bring an asset back online). In some examples, the ontology data 530 describes the operational aspects of processes and their related assets.

In some implementations, the enterprise information extraction module 514 extracts relevant financial data and operational data from respective data sources with respect to the financial and operational aspects ontology. In some examples, the enterprise information extraction module 514 provides a set of operational metadata and a set of financial metadata. The set of operational metadata can include metadata that associates types of assets (e.g., servers, software), provided from the operational ontology data 530 with time and/or technical expenses (e.g., memory, processors, bandwidth expended) to bring the type of asset back online, if the asset were to incur downtime (e.g., as a result of a cyberattack). The set of financial metadata can include metadata that associates types of assets and processes executed by the enterprise with cost (e.g., cost per day if a process is down, cost per hour if an asset is down).

In some implementations, the AAG enrichment module 516 processes the set of operational metadata, the set of financial metadata, the sub-set of groups, and the AAG to provide a process aware AAG. For example, the process aware AAG can include asset nodes for each asset in the enterprise network, group nodes for groups in the sub-set of groups, and AAG nodes from the AAG. In some examples, the process aware AAG includes edges between nodes representing relationships therebetween. For example, an edge can connect an asset node to a group node to indicate that the asset represented by the asset node is correlated to the group represented by the group node. As another example, an edge can connect an asset node to an AAG node to indicate that the asset represented by the asset node is related to the AAG node. As another example, an edge can connect an AAG node with an AAG type node (e.g., rule, fact, impact, as described herein with reference to FIG. 3) to indicate that the AAG node is of a respective type of AAG node.

In some examples, nodes of the process aware AAG are associated with metadata that represents sets of properties. In some examples, a set of properties includes description, operational data and/or financial data. For example, for a group node, a set of properties can include a label assigned to the group and a downtime cost indicating a financial cost incurred, if the process represented by the group were to go down (e.g., $10,000 per day). As another example, for an asset node, a set of properties can include an IP address of the asset, an OS executing on the asset, a recovery time (e.g., 10 hours) and a financial cost, if the asset represented by the asset node were to go down (e.g., $10 per hour).

In some implementations, the process aware AAG is provided as a knowledge graph, which can be described as a collection of data and relations based on a schema representing entities and relationships between entities. The data can be logically described as a graph (even though also provided in table form), in which each distinct entity is represented by a respective node, and each relationship between a pair of entities is represented by an edge between the nodes. Each edge is associated with a relationship and the existence of the edge represents that the associated relationship exists between the nodes connected by the edge. For example, if a node A represents an asset Alpha, a node B represents a group Beta, and an edge E is associated with the relationship "is correlated to," then having the edge E connect the nodes in the direction from node A to node B in the graph represents the fact that Alpha is in the group Beta. In some examples, the knowledge graph can be enlarged with schema-related knowledge (e.g., Alpha is a concept Server, Charlie is a concept Database, and "retrieves data from" is a property or relationship between two the entities). Adding schema-related information supports evaluation of reasoning results. A knowledge graph can be represented by any of a variety of physical data structures. For example, a knowledge graph can be represented by triples that each represent two entities in order, and a relationship from the first to the second entity; for example, [alpha, beta, is correlated to], or [alpha, is correlated to, beta], are alternative ways of representing the same fact. Each entity and each relationship can be, and generally will be, included in multiple triples.

In some examples, each entity can be stored as a node once, as a record or an object, for example, and linked through a linked list data structure to all the relationships the entity has, and all the other entities to which the entity is related. More specifically, a knowledge graph can be stored as an adjacency list in which the adjacency information includes relationship information. In some examples, each distinct entity and each distinct relationship are represented with respective, unique identifiers.

Figure 7:
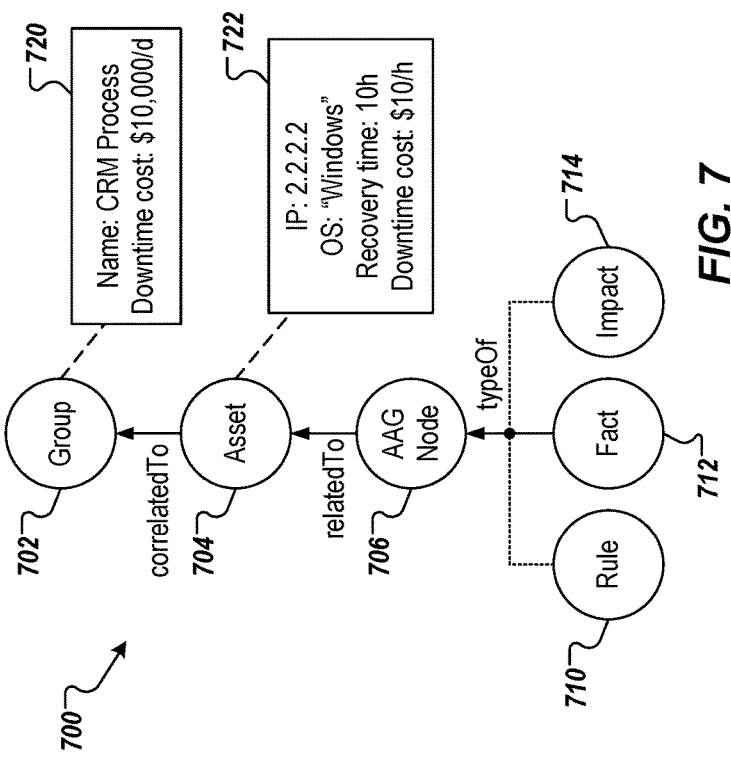
FIG. 7 depicts an example representation of a portion of a process aware AAG in accordance with implementations of the present disclosure.

FIG. 7 depicts an example portion of a process aware AAG 700 in accordance with implementations of the present disclosure. In the example of FIG. 7, the process aware AAG includes a group node 702, an asset node 704, and an AAG node 706. The AAG node 706 is associated with one or multiple type nodes, which are provided as a rule node 710, a fact node 712, and an impact node 714. That is, each AAG node in an AAG can be of only one type of node. In the example of FIG. 7, the AAG node 706 is associated with (represented as a solid edge) the fact node 712. The process aware AAG 700 further includes a set of properties 720 associated with the group node 702 and a set of properties 722 associated with the asset node 704.

Accordingly, the process aware AAG 700 provides contextual information that can be used in mitigating cyber-security risk. For example, it can be determined from the process aware AAG 700 that, if the asset represented by the asset node 704 were to go down as the result of a cyber-security attack, it would cost approximately $100 and 10 hours to being the asset back online. However, because the asset supports a process and, if the process were to go down, because the asset was down, the cost would be approximately $4,167 for a total of $4,267 (cost due to process downtime and cost to bring asset back online).

It is appreciated that the process aware AAG 700 of FIG. 7 is simplified to illustrate implementations of the present disclosure. For example, while the group node 702 is associated with a single asset node, the asset node 704, it is contemplated that a group node can be associated with multiple asset nodes (e.g., an asset node representing each asset that is implicated during execution of the process that is represented by the process aware AAG). As described in further detail herein, in generating an aggregation graph, asset nodes of a process aware AAG can be consolidated to the group node.

In accordance with implementations of the present disclosure, the process aware AAG enables time- and resource-efficient analytics to be performed. For example, because the process aware AAG can be described as an abstracted version of an underlying AAG (i.e., the process aware AAG has a reduced number of nodes and edges as compared to the AAG), graph processing of the process aware AAG expends fewer technical resources (e.g., memory, processors, bandwidth) than graph processing of the AAG.

Further, the process aware AAG provides contextual information that is absent from the underlying AAG. As a result, analytics can be performed using the process aware AAG that cannot be performed using the underlying AAG. Example analytics include, without limitation, impact analysis in case of cyber-attack, abstraction of AAGs to enable visual accessibility and/or graph reduction (e.g., reduce size of, and thus, memory consumed by an AAG), and identifying potential crown-jewels that would be defined as the target for AAG generation. In providing process aware AAGs, implementations of the present disclosure provide uniqueness and advantages over traditional approaches. For examples, although existing tools can generate an AAG over large IT networks, none of these tools is able to map between process and infrastructure layers automatically. Further, the AAG enrichment of the present disclosure is based on network logical analysis and provides multi-perspective process aware AAGs as unique representations.

In some examples, the process aware AAG of the present disclosure enables multiple follow-on use cases. Example use cases can include providing an assessment of technical resources to be expended to mitigate cyber security risks (e.g., memory, processors, bandwidth to implement remedial action), providing a financial assessment of cyber security risks (e.g., cost to implement remedial action), and prioritization of remedial actions (e.g., implement cost-effective remedial actions that have highest mitigation of risk). Having the ability to relate an IT asset (which is found to be in a cyber risk) to the processes it is participating in, and deriving its value, makes it possible to estimate the financial risk (e.g., financial impact, if process is taken offline) and prioritize it accordingly. Another example use case includes identifying crown-jewels by cyber security aspect. IT assets that are determined to be participating in many major processes should be native candidates. Another example use case includes maintaining an ongoing cyber risk image of all units in the enterprise and being notified of increases in the risk of a unit.

For example, a process aware AAG enables analytics to be performed to identify and prioritize remedial actions that can be taken within the enterprise network to mitigate risk. With non-limiting reference to the process aware AAG 700 of FIG. 7, it can be determined that, while the asset represented by the asset node 704 is relatively inexpensive to resolve, such an occurrence has a larger downstream effect of taking a relatively expensive process offline. Consequently, it can be determined that one or more remedial actions can be taken to the asset to mitigate cyber-security risk to the process. Example remedial actions can include, without limitation, a remedial action that increases the difficulty (hardness) in achieving an impact (e.g., taking the asset offline), and a remedial action that entirely removes an impact from being achieved. For example, software can be updated (e.g., patched) to obviate a security loophole in a previous version of the software executing on the asset. As another example, access to the asset can be (temporarily) blocked to inhibit execution of a cyber-attack.

Figure 8:
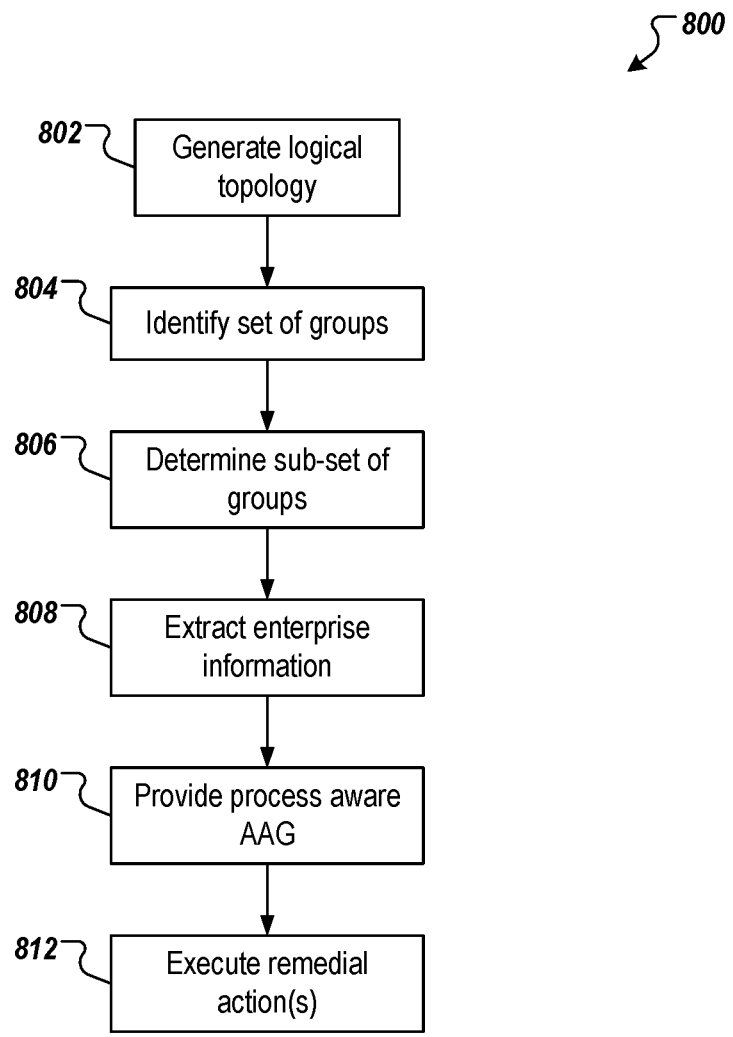
FIG. 8 depicts an example process that can be executed in accordance with implementations of the present disclosure.

FIG. 8 depicts an example process 800 that can be executed in accordance with implementations of the present disclosure. In some examples, the example process 800 is provided using one or more computer-executable programs executed by one or more computing devices.

A logical topology is generated (802). For example, and as described herein, the logical topology generation module 506 receives the logical network ontology data 520, the asset inventory data 522, and the asset communications data 524. The logical topology generation module 506 retrieves specifications (e.g., from the logical network ontology) and facts (e.g., from the asset inventory, the asset communication) and generates a graph representation of an enterprise logical topology. In some examples, for each asset in the asset inventory data 522, a node can be provided in the logical topology, and metadata can be associated with the node that describes properties of the assets (e.g., asset type from ontology, OS, IP address). For instances of communication between assets represented in the asset communications data 524, an edge can be provided between respective nodes, and metadata can be associated with the edge that describes properties of the communications (e.g., protocol, individual properties, aggregate properties).

A set of groups is identified (804). For example, and as described herein, the community detection module 508 executes group detection over the logical topology provided from the logical topology generation module 506 using a community detection algorithm, such as LCD. In some examples, each group in the set of groups is associated with a set of assets indicating one or more assets that is included in the respective group. A sub-set of groups is determined (806). For example, and as described herein, the thresholding and labeling module 510 evaluates a quality of groups in the set of groups output by the community detection module 508 and, each group that is determined to have a sufficient quality is included in the sub-set of groups. In some examples, conductance and normalized cut are determined for each group and, if both conductance and normalized cut of a group are below a threshold (e.g., 0.5), the group is included in the sub-set of groups.

Enterprise information is extracted (808). For example, and as described herein, the enterprise information extraction module 514 extracts relevant financial data and operational data from respective data sources with respect to the financial and operational aspects ontology. In some examples, the enterprise information extraction module 514 provides a set of operational metadata and a set of financial metadata. A process aware AAG is provided (810). For example, and as described herein, the AAG enrichment module 516 processes the set of operational metadata, the set of financial metadata, the sub-set of groups, and the AAG to provide a process aware AAG. One or more remedial actions are executed (812). For example, and as described herein, analytics can be executed using the process aware AAG to identify and prioritize remedial actions that can be taken within the enterprise network to mitigate risk. At least one remedial action can be executed to reduce the cyber security risk to the underlying enterprise network.

As introduced above, implementations of the present disclosure are also directed to using process aware AAGs for abstracting enterprise processes within enterprise networks. In general, abstractions of enterprise processes includes receiving a process aware AAG, processing the process aware AAG through grouping and aggregation, and outputting a process-abstracted graph, also referred to as an aggregated graph. In some examples, each node in the aggregated graph represents a respective process group and each edge represents an association between process groups. In some examples, an association represents a fact that there is a lateral movement between assets related to the process groups associated by the edge.

Figure 9:
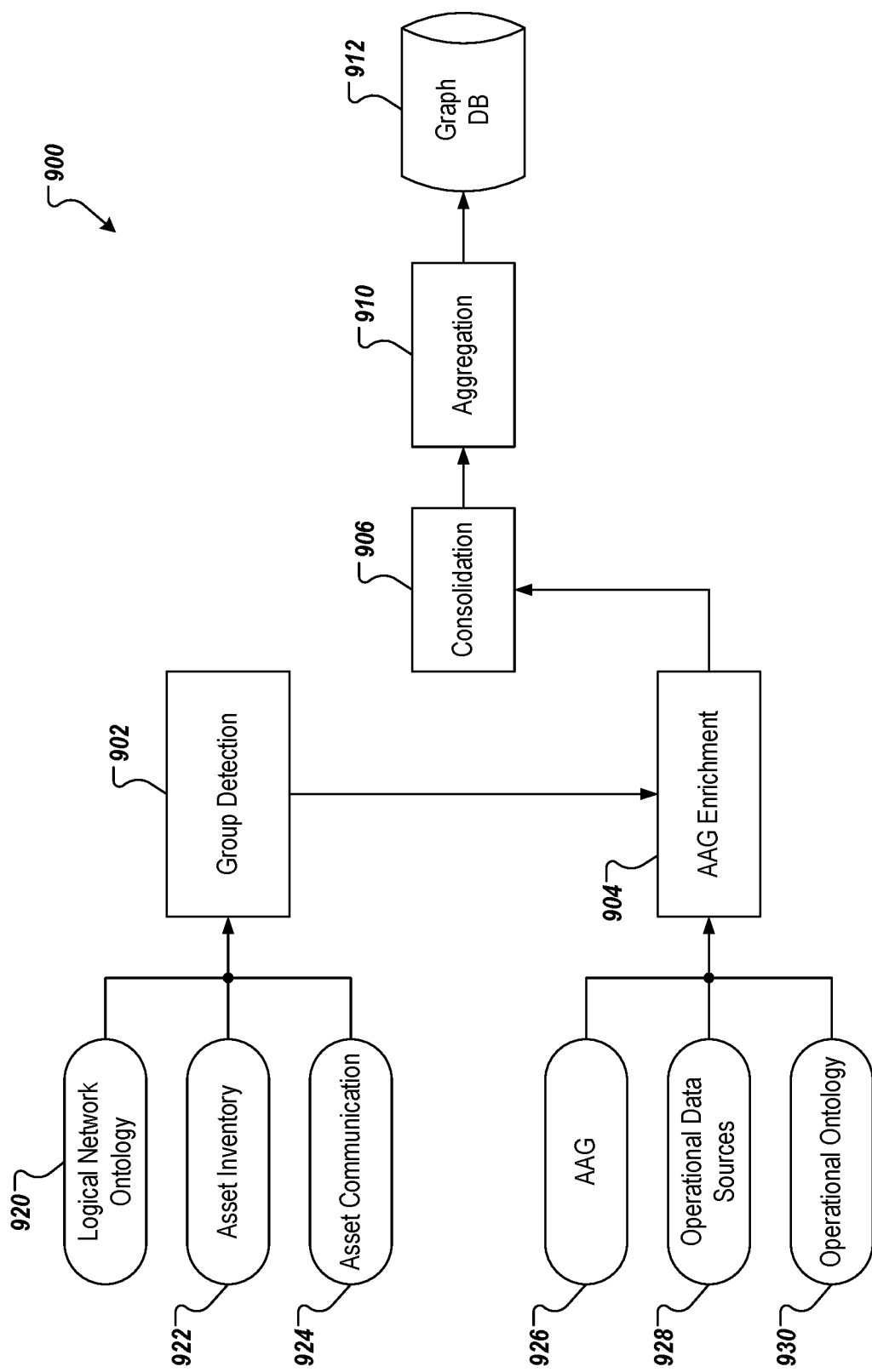
FIG. 9 depicts an example architecture for an abstraction platform in accordance with implementations of the present disclosure.

FIG. 9 depicts an example architecture for an abstraction platform 900 in accordance with implementations of the present disclosure. The abstraction platform 900 performs AAG abstraction by grouping assets related to the same process groups from a process aware AAG. In the example of FIG. 9, the abstraction platform 900 includes group detection 902, AAG enrichment 904, a consolidation module 906, an aggregation module 910, and a graph DB 912.

In some examples, the group detection 902 corresponds to the group detection 502 of FIG. 5 and the AAG enrichment corresponds to the AAG enrichment 504. The group detection 902 processes logical network ontology data 920, asset inventory data 922, and asset communication data 924 to provide a sub-set of groups (e.g., as described above with reference to the group detection 502 of FIG. 5). The AAG enrichment 904 processes an AAG 926, data from operations data sources 928, operation ontology data, and the sub-set of groups to provide a process aware AAG (e.g., as described above with reference to the AAG enrichment 504 of FIG. 5).

In some implementations, the consolidation module 906 processes the process aware AAG to consolidate assets to related process groups. In some examples, consolidation can include generating metadata representative of child nodes of a group node (e.g., asset nodes that are correlated to a group node) and associating the metadata with the group node. In this manner, a single node can be provided for each group and the metadata can represent properties of a respective process group. Example properties can include, without limitation, a list of assets and a list of rules and a list of facts that enable performing lateral movement among assets within the respective group.

In some implementations, associations between process groups are determined and an edge is provided between group nodes representing the respective process groups. In some examples, multiple types of associations can be provided. A first type of association includes joint assets, in which one or more assets are associated with a first group and a second group. A second type of association includes existence of at least one impact that could trigger lateral movement between two assets that do not belong to the same group. For example, an impact to a first asset in a first group can enable lateral movement from the first asset to a second asset in a second group. Accordingly, the consolidation module 906 provides a process group graph that represents multiple process groups and relationships between process groups.

In some implementations, the process group graph and metadata are provided to the aggregation module 910, which performs one or more aggregations over metadata to provide aggregate metadata. Example metadata can include, without limitation, metadata representing AAG paths and metadata representing hardness in moving along AAG paths. The aggregate metadata is associated with respective group nodes to provide the aggregation graph. In some examples, the aggregation graph is provided as a knowledge graph (e.g., discussed above with respect to the process aware AAG).

Further details on AAG paths and hardness are described in commonly assigned U.S. application Ser. No. 17/080,252, filed on Oct. 26, 2020, and entitled Process Risk Calculation Based on the Hardness of Attack Paths, the disclosure of which is expressly incorporated herein by reference for all purposes. In general, an AAG path, also referred to as attack path, is a path of lateral movement across assets of an enterprise network that an attacker could take to affect an attack. Consequently, each asset can lie along one or more AAG paths. Hardness generally refers to a difficulty an attacker would have to travel along an AAG. For example, some lateral movements are more difficult to perform than other lateral movements. A hardness score provides a measure of this difficulty. Lateral movements that are more easily performed can be deemed to be more hackable than lateral movements that are more difficult to perform. Accordingly, each AAG path can be associated with multiple hardness scores (e.g., a hardness score for lateral movement between assets) and a total hardness score (e.g., a hardness score to move along the entire path).

In accordance with implementations of the present disclosure, multiple aggregations of cyber-related metrics are performed for each group. Example aggregations include, without limitation, AAG paths (Sum), AAG paths per asset (Avg, Min, Max, Std), total hardness score (sum of hardness exploiting vulnerabilities related to the process group), and process group hardness share of voice (e.g., portion of hardness that the process group contributes to total hardness of all process groups).

Figure 10:
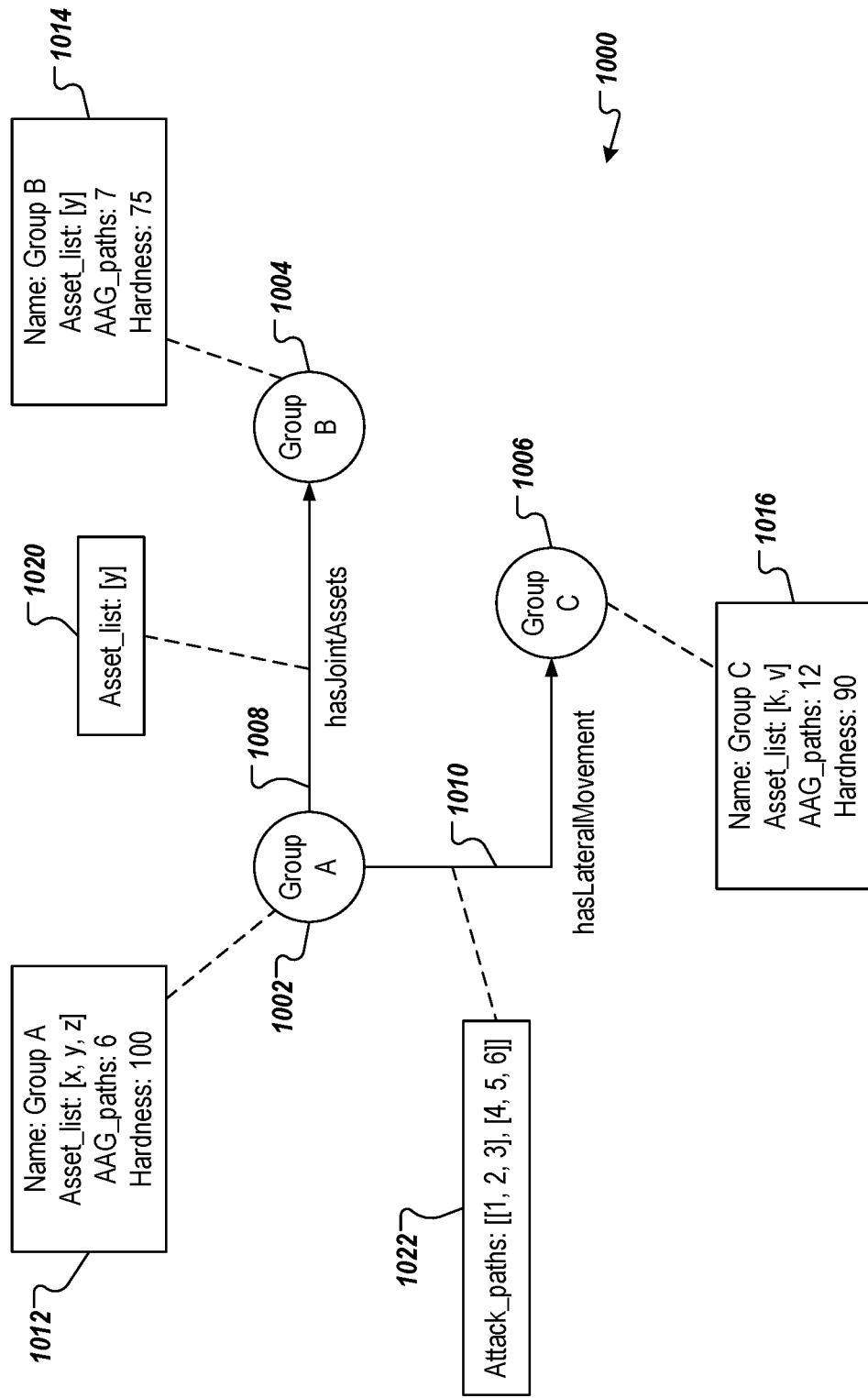
FIG. 10 depicts an example aggregation graph in accordance with implementations of the present disclosure.

FIG. 10 depicts an example aggregation graph 1000 in accordance with implementations of the present disclosure. In the example of FIG. 10, the aggregation graph includes a first group node 1002, a second group node 1004, a third group node 1006, an edge 1008, and an edge 1010. The first group node 1002 is associated with a first set of properties 1012, the second group node 1004 is associated with a second set of properties 1014, and the third group node 1006 is associated with a third set of properties 1016. The first edge 1008 is associated with a set of properties 1020 and the second edge is associated with a set of properties 1022.

In the example of FIG. 10, the first group node 1002 and the second group node 1004 are related as a result of the respective groups including the same asset, namely asset y in the depicted example. This is represented in the set or properties 1020 of the first edge 1008. The first group node 1002 and the third group node 1006 are related as a result of at least one asset of the first group node 1002 lying along an attack path (AAG path) that at least one asset of the second group node 1006 also lies along. This is represented in the set or properties 1022 of the second edge 1010.

In the example of FIG. 10, each of the first set of properties 1012, the second set of properties 1014, and the third set of properties 1016 includes aggregates. For example, each of the first set of properties 1012, the second set of properties 1014, and the third set of properties 1016 includes aggregates. For example, for a process group a total number of AAG paths over all assets included in the process group can be determined. In some examples, each asset is associated with one or more AAG paths and the total number of AAG paths is provided as the sum of AAG paths over all assets. This is depicted in each of the first set of properties 1012, the second set of properties 1014, and the third set of properties 1016 as AAG paths. As another example, a total hardness score is determined for the respective process groups, as also depicted in each of the first set of properties 1012, the second set of properties 1014, and the third set of properties 1016.

In some instances, and as introduced above, an AAG can include hundreds of thousands to millions of nodes. Consequently, the AAG can be problematic in terms of usefulness and resource expense in graph processing for analytics, for example. Further, large AAGs can be difficult to navigate and/or discern useful information from, and large AAGs require increased memory and processing. In view of this, the aggregation graph of the present disclosure is more manageable in terms of usefulness and is less burdensome on technical resources than the AAG, from which the aggregation graph is developed. That is, the aggregation graph of the present disclosure improves visual accessibility while preserving key features, provides a reduced size enabling scale-up of cyber-analytics, and provides abstraction based on process-dimensions to support further analysis in the cyber security context.

Accordingly, the aggregation graph of the present disclosure enables use cases that cannot otherwise be provided using an AAG. An example use case can include providing the aggregation graph within a visualization framework to enable users (e.g., cyber security experts) to assess impacts risks to processes can have on one another (e.g., impact of a cyber attack that effects a first process one a second process). As another use case, the aggregation graph of the present disclosure enables analytics of which asset connect multiple groups within an enterprise and network segmentation to be performed. For example, network segmentation can be executed to dissociate an asset from multiple processes. In the example of FIG. 10, asset y can be segmented from either Group A or Group B, such that the impact of an attack on asset y only exposes a single process to the attack. In some examples, segmenting can include moving one or more tasks of the process from a first (e.g., asset y) asset to another asset within the network, such that the asset (e.g., asset y) is no longer implicated in execution of the process.

In this manner, a risk envelope of the asset is reduced from potentially impacting multiple processes to a single process. As another use case, the aggregation graph of the present disclosure enables analysis of which vulnerabilities could expose some process of an enterprise in the event that another process is attacked. In the example of FIG. 10, it can be determined that the process of Group A can expose the process of Group C to attack.

Figure 11:
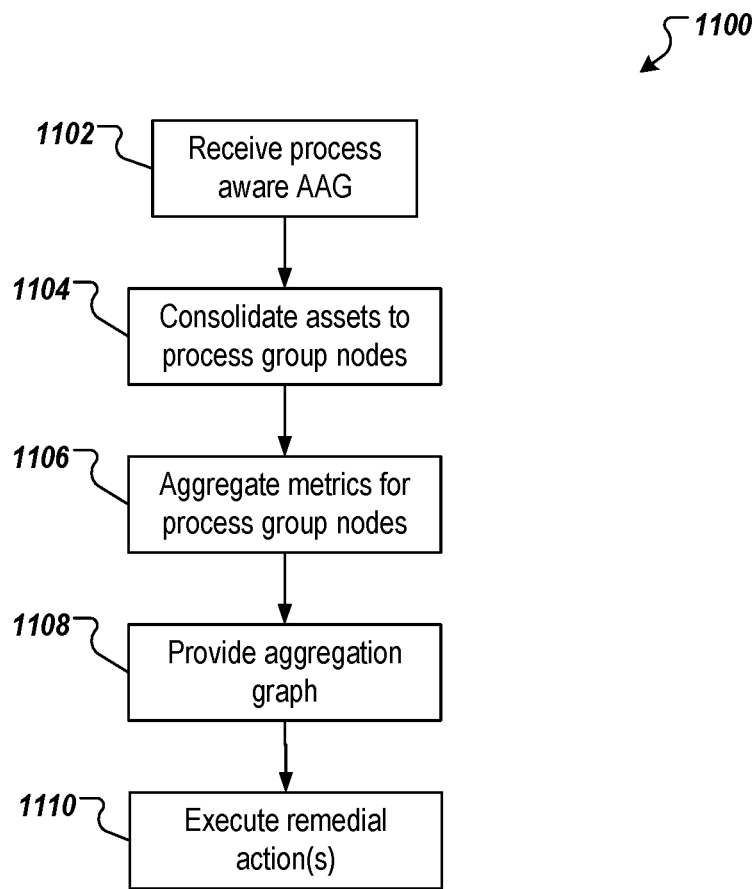
FIG. 11 depicts an example process that can be executed in accordance with implementations of the present disclosure.

FIG. 11 depicts an example process 1100 that can be executed in accordance with implementations of the present disclosure. In some examples, the example process 1100 is provided using one or more computer-executable programs executed by one or more computing devices.

A process aware AAG is received (1102). For example, and as described herein, the consolidation module 906 of FIG. 9 receives the process aware AAG from the AAG enrichment module 904 (e.g., the AAG enrichment module 516 of FIG. 5). Asset representations of the process aware AAG are consolidated to process group nodes (1104). For example, and as described herein, the consolidation module 906 processes the process aware AAG to consolidate assets to related process groups and provide a. In some examples, consolidation can include generating metadata representative of child nodes of a group node (e.g., asset nodes that are correlated to a group node) and associating the metadata with the group node. In this manner, a single node can be provided for each group and the metadata can represent properties of a respective process group. Example properties can include, without limitation, a list of assets and a list of rules and a list of facts that enable performing lateral movement among assets within the respective group.

Metrics for process group nodes are aggregated (1106). For example, and as described herein, the process group graph and metadata are provided to the aggregation module 910, which performs one or more aggregations over metadata to provide aggregate metadata. Example metadata can include, without limitation, metadata representing AAG paths and metadata representing hardness in moving along AAG paths. An aggregation graph is provided (1108). For example, and as described herein, the aggregation module 910 outputs the aggregation graph for storage in the graph DB 912. One or more remedial actions are executed (812). For example, and as described herein, the aggregation graph of the present disclosure enables analytics of which asset connect multiple groups within an enterprise and network segmentation to be performed. For example, network segmentation can be executed to dissociate an asset from multiple processes (e.g., asset y can be segmented from either Group A or Group B, such that the impact of an attack on asset y only exposes a single process to an attack).

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for enterprise network security using a process aware analytical attack graph (AAG) based on an AAG representative of potential lateral movement within an enterprise network, the method executed by one or more processors and comprising:

receiving the AAG from computer-readable memory;
generating from logical network ontology data, asset inventory data, and asset communication data, a logical topology of the enterprise network as a computer-readable data structure;
defining a sub-set of groups within the enterprise network, including:
  executing community detection over the logical topology; and
  determining a quality of respective groups in a set of groups based on a set of measures including conductance and normalized cut,
  each group representing a process of a plurality of processes, each process at least partially executed by one or more assets within the enterprise network;
processing the AAG based on the sub-set of groups and data from one or more contextual data sources to provide the process aware AAG, the process aware AAG defining a mapping between an infrastructure-layer of the enterprise network and a process-layer of the enterprise network;
storing the process aware AAG as a computer-readable data structure to computer-readable memory; and
executing one or more remedial actions in the enterprise network in response to analytics executed on the process aware AAG.

2. The computer-implemented method of claim 1, wherein community detection comprises executing hierarchical clustering over the logical topology to iteratively cluster nodes into groups in a set of groups.

3. The computer-implemented method of claim 1, wherein the logical topology is representative of the enterprise network based on facts provided from each of the asset inventory data and the asset communication data.

4. The computer-implemented method of claim 1, wherein the logical ontology comprises nodes representative of assets within the enterprise network and edges representative of communication between assets, each node and each edge associated with a set of properties defining metadata describing a respective asset or a respective edge.

5. The computer-implemented method of claim 1, wherein the process aware AAG comprises a set of group nodes and a set of asset nodes, each asset node being associated with at least one group node by an edge, each of the group nodes and each of the asset nodes associated with a set of properties defining metadata describing context of a respective group node and asset node.

6. The computer-implemented method of claim 5, wherein the context comprises one or more of technical impact and financial impact.

7. A non-transitory computer-readable storage medium coupled to one or more processors and having instructions stored thereon which, when executed by the one or more processors, cause the one or more processors to perform operations for enterprise network security using a process aware analytical attack graph (AAG) based on an AAG representative of potential lateral movement within an enterprise network, the operations comprising:
receiving the AAG from computer-readable memory;
generating from logical network ontology data, asset inventory data, and asset communication data, a logical topology of the enterprise network as a computer-readable data structure;
defining a sub-set of groups within the enterprise network, including:
  executing community detection over the logical topology; and
  determining a quality of respective groups in a set of groups based on a set of measures including conductance and normalized cut,
  each group representing a process of a plurality of processes, each process at least partially executed by one or more assets within the enterprise network;
processing the AAG based on the sub-set of groups and data from one or more contextual data sources to provide the process aware AAG, the process aware AAG defining a mapping between an infrastructure-layer of the enterprise network and a process-layer of the enterprise network;
storing the process aware AAG as a computer-readable data structure to computer-readable memory; and
executing one or more remedial actions in the enterprise network in response to analytics executed on the process aware AAG.

8. The non-transitory computer-readable storage medium of claim 7, wherein community detection comprises executing hierarchical clustering over the logical topology to iteratively cluster nodes into groups in a set of groups.

9. The non-transitory computer-readable storage medium of claim 8, wherein the logical topology is representative of the enterprise network based on facts provided from each of the asset inventory data and the asset communication data.

10. The non-transitory computer-readable storage medium of claim 7, wherein the logical ontology comprises nodes representative of assets within the enterprise network and edges representative of communication between assets, each node and each edge associated with a set of properties defining metadata describing a respective asset or a respective edge.

11. The non-transitory computer-readable storage medium of claim 7, wherein the process aware AAG comprises a set of group nodes and a set of asset nodes, each asset node associated with at least one group node by an edge, each of the group nodes and each of the asset nodes associated with a set of properties defining metadata describing context of a respective group node and asset node.

12. The non-transitory computer-readable storage medium of claim 11, wherein the context comprises one or more of technical impact and financial impact.

13. A system, comprising:
a computing device; and
a non-transitory computer-readable storage device coupled to the computing device and having instructions stored thereon which, when executed by the computing device, cause the computing device to perform operations for enterprise network security using a process aware analytical attack graph (AAG) based on an AAG representative of potential lateral movement within an enterprise network, the operations comprising:
receiving the AAG from computer-readable memory;
generating from logical network ontology data, asset inventory data, and asset communication data, a logical topology of the enterprise network as a computer-readable data structure;
defining a sub-set of groups within the enterprise network, including:
  executing community detection over the logical topology; and
  determining a quality of respective groups in a set of groups based on a set of measures including conductance and normalized cut, each group representing a process of a plurality of processes, each process at least partially executed by one or more assets within the enterprise network;

processing the AAG based on the sub-set of groups and data from one or more contextual data sources to provide the process aware AAG, the process aware AAG defining a mapping between an infrastructure-layer of the enterprise network and a process-layer of the enterprise network;

storing the process aware AAG as a computer-readable data structure to computer-readable memory; and executing one or more remedial actions in the enterprise network in response to analytics executed on the process aware AAG.

14. The system of claim 13, wherein community detection comprises executing hierarchical clustering over the logical topology to iteratively cluster nodes into groups in a set of groups.

15. The system of claim 13, wherein the logical topology is representative of the enterprise network based on facts provided from each of the asset inventory data and the asset communication data.

16. The system of claim 13, wherein the logical ontology comprises nodes representative of assets within the enterprise network and edges representative of communication between assets, each node and each edge associated with a set of properties defining metadata describing a respective asset or a respective edge.

17. The system of claim 13, wherein the process aware AAG comprises a set of group nodes and a set of asset nodes, each asset node associated with at least one group node by an edge, each of the group nodes and each of the asset nodes associated with a set of properties defining metadata describing context of a respective group node and asset node.

* * * * *

UNITED STATES PATENT AND TRADEMARK OFFICE
CERTIFICATE OF CORRECTION

PATENT NO. : 11,876,824 B2
APPLICATION NO. : 17/358381
DATED : January 16, 2024
INVENTOR(S) : Gal Engelberg et al.

It is certified that error appears in the above-identified patent and that said Letters Patent is hereby corrected as shown below:

In the Claims

Claim 5, Column 27, Line 45, after "node" delete "being".

Claim 9, Column 28, Line 25, delete "claim 8," and insert -- claim 7, --.

Signed and Sealed this
Twenty-first Day of May, 2024

*Katherine Kelly Vidal*

Katherine Kelly Vidal
*Director of the United States Patent and Trademark Office*